(12) United States Patent
Manolakos et al.

(10) Patent No.: US 11,792,607 B2
(45) Date of Patent: Oct. 17, 2023

(54) POSITIONING SIGNAL FREQUENCY HOP AGGREGATION

(71) Applicant: QUALCOMM Incorporated, San Diego, CA (US)

(72) Inventors: Alexandros Manolakos, Escondido, CA (US); Mukesh Kumar, Hyderabad (IN); Guttorm Ringstad Opshaug, Redwood City, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/348,407

(22) Filed: Jun. 15, 2021

(65) Prior Publication Data

US 2022/0030390 A1 Jan. 27, 2022

Related U.S. Application Data

(60) Provisional application No. 63/055,055, filed on Jul. 22, 2020.

(51) Int. Cl.
*H04W 4/029* (2018.01)
*H04L 5/00* (2006.01)
(Continued)

(52) U.S. Cl.
CPC ........... *H04W 4/029* (2018.02); *G01S 5/0244* (2020.05); *G01S 5/10* (2013.01); *H04L 5/0048* (2013.01); *H04B 1/713* (2013.01)

(58) Field of Classification Search
CPC ..... H04W 4/029; H04W 64/00; G01S 5/0244; G01S 5/10; G01S 1/0428; G01S 5/0036;
(Continued)

(56) References Cited

U.S. PATENT DOCUMENTS

2017/0339658 A1* 11/2017 Wang ................ G01S 5/021
2018/0139763 A1 5/2018 Bitra et al.
(Continued)

FOREIGN PATENT DOCUMENTS

WO WO-2012121774 A2 * 9/2012 ........... H04B 7/2656
WO 2020046483 A1 3/2020

OTHER PUBLICATIONS

International Search Report and Written Opinion—PCT/US2021/037548—ISA/EPO—dated Sep. 28, 2021.

*Primary Examiner* — Kabir A Timory
(74) *Attorney, Agent, or Firm* — QUALCOMM Incorporated

(57) ABSTRACT

A method of facilitating position determination of a user equipment includes: receiving, at the user equipment, a first plurality of positioning reference signal portions having a corresponding plurality of frequency sub-bands; processing, at the user equipment, one or more of the first plurality of positioning reference signal portions to determine position information; and at least one of: transmitting a capability message, to a network entity, indicating a processing capability of the user equipment to process, in combination, positioning reference signal portions having different frequency sub-bands to determine the position information; or transmitting a signal-combination indication, to the network entity, indicating a second plurality of positioning reference signal portions, of the first plurality of positioning reference signal portions, processed by the user equipment in combination to determine the position information.

30 Claims, 10 Drawing Sheets

(51) Int. Cl.
  *G01S 5/02* (2010.01)
  *G01S 5/10* (2006.01)
  *H04B 1/713* (2011.01)
(58) Field of Classification Search
  CPC ... G01S 5/0205; H04L 5/0048; H04L 5/0007; H04B 1/713
  See application file for complete search history.

(56) References Cited

U.S. PATENT DOCUMENTS

2020/0236644 A1* 7/2020 Gunnarsson .......... H04W 64/00
2021/0126754 A1* 4/2021 Da .................... H04L 27/26025

* cited by examiner

POSITIONING SIGNAL FREQUENCY HOP AGGREGATION

CROSS-REFERENCE TO RELATED APPLICATIONS

This application claims the benefit of U.S. Provisional Application No. 63/055,055, filed Jul. 22, 2020, entitled "POSITIONING SIGNAL FREQUENCY HOP AGGREGATION," assigned to the assignee hereof, and the entire contents of which are hereby incorporated herein by reference.

BACKGROUND

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service, a fourth-generation (4G) service (e.g., Long Term Evolution (LTE) or WiMax), a fifth-generation (5G) service, etc. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Orthogonal Frequency Division Multiple Access (OFDMA), Time Division Multiple Access (TDMA), the Global System for Mobile access (GSM) variation of TDMA, etc.

A fifth generation (5G) mobile standard calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

Obtaining the locations of mobile devices that are accessing a wireless network may be useful for many applications including, for example, emergency calls, personal navigation, asset tracking, locating a friend or family member, etc. Existing positioning methods include methods based on measuring radio signals transmitted from a variety of devices or entities including satellite vehicles (SVs) and terrestrial radio sources in a wireless network such as base stations and access points. It is expected that standardization for the 5G wireless networks will include support for various positioning methods, which may utilize reference signals transmitted by base stations in a manner similar to which LTE wireless networks currently utilize Positioning Reference Signals (PRS) and/or Cell-specific Reference Signals (CRS) for position determination.

SUMMARY

An example user equipment configured for wireless signal exchange includes: a transceiver; a memory; and a processor, communicatively coupled to the transceiver and the memory, and configured to: receive, via the transceiver, a first plurality of positioning reference signal portions having a corresponding plurality of frequency sub-bands; process one or more of the first plurality of positioning reference signal portions to determine position information; and at least one of: transmit a capability message, via the transceiver to a network entity, indicating a processing capability of the user equipment to process, in combination, positioning reference signal portions having different frequency sub-bands to determine the position information; or transmit a signal-combination indication, via the transceiver to the network entity, indicating a second plurality of positioning reference signal portions, of the first plurality of positioning reference signal portions, processed by the processor in combination to determine the position information.

Implementations of such a user equipment may include one or more of the following features. The processor is configured to coherently combine all of the first plurality of positioning reference signal portions to determine the position information. The processor is configured to coherently combine fewer than all of the first plurality of positioning reference signal portions. The processor is configured to transmit the capability message, the processing capability is that the processor is configured to process the second plurality of positioning reference signal portions in combination, and the capability message includes one or more criteria regarding the second plurality of positioning reference signal portions. The one or more criteria include: a quantity of the second plurality of positioning reference signal portions that the processor is configured to coherently combine; or a maximum time separation between any consecutive-in-time pair of the second plurality of positioning reference signal portions that the processor is configured to coherently combine; or a maximum frequency separation between any consecutive-in-frequency pair of the second plurality of positioning reference signal portions that the processor is configured to coherently combine; or a maximum frequency span of the second plurality of positioning reference signal portions that the processor is configured to coherently combine; or which of the first plurality of positioning reference signal portions include the second plurality of positioning reference signal portions.

Also or alternatively, implementations of such a user equipment may include one or more of the following features. The processor is configured to transmit the capability message, and the processing capability is that the processor is configured to process the one or more of the first plurality of positioning reference signal portions separately. The processor is configured to transmit the signal-combination indication including a bitmap indicating the second plurality of positioning reference signal portions. The processor is configured to transmit the position information, via the transceiver, to the network entity, and the position information includes: a time of arrival; and an indication of one or more of the one or more first plurality of positioning reference signal portions processed by the processor to determine the time of arrival. The position information includes: a plurality of times of arrival; and a plurality of portion indications each indicating the one or more of the one or more first plurality of positioning reference signal portions processed by the processor to determine a corresponding one of the plurality of times of arrival.

Also or alternatively, implementations of such a user equipment may include one or more of the following features. The processor is configured to transmit the position information, via the transceiver, to the network entity, and the position information includes: a time of arrival; and an accuracy indication indicating an accuracy of the time of arrival.

Another example user equipment configured for wireless signal exchange includes: means for receiving a first plurality of positioning reference signal portions having a corresponding plurality of frequency sub-bands; processing means for processing one or more of the first plurality of positioning reference signal portions to determine position information; and at least one of: first transmitting means for transmitting a capability message, to a network entity, indicating a processing capability of the means for processing to process, in combination, positioning reference signal portions having different frequency sub-bands to determine the position information; or second transmitting means for transmitting a signal-combination indication, to the network entity, indicating a second plurality of positioning reference signal portions, of the first plurality of positioning reference signal portions, processed by the processing means in combination to determine the position information.

Implementations of such a user equipment may include one or more of the following features. The processing means include means for coherently combining all of the first plurality of positioning reference signal portions to determine the position information. The processing means include means for coherently combining fewer than all of the first plurality of positioning reference signal portions. The user equipment includes the first transmitting means, the processing capability is that the processing means include means for processing the second plurality of positioning reference signal portions in combination, and the capability message includes one or more criteria regarding the second plurality of positioning reference signal portions.

An example method of facilitating position determination of a user equipment includes: receiving, at the user equipment, a first plurality of positioning reference signal portions having a corresponding plurality of frequency sub-bands; processing, at the user equipment, one or more of the first plurality of positioning reference signal portions to determine position information; and at least one of: transmitting a capability message, to a network entity, indicating a processing capability of the user equipment to process, in combination, positioning reference signal portions having different frequency sub-bands to determine the position information; or transmitting a signal-combination indication, to the network entity, indicating a second plurality of positioning reference signal portions, of the first plurality of positioning reference signal portions, processed by the user equipment in combination to determine the position information.

Implementations of such a method may include one or more of the following features. Processing the one or more of the first plurality of positioning reference signal portions includes coherently combining all of the first plurality of positioning reference signal portions to determine the position information. Processing the one or more of the first plurality of positioning reference signal portions includes coherently combining fewer than all of the first plurality of positioning reference signal portions. The method includes transmitting the capability message, and the processing capability is that the user equipment is configured to process the second plurality of positioning reference signal portions in combination, and the capability message includes one or more criteria regarding the second plurality of positioning reference signal portions. The one or more criteria include: a quantity of the second plurality of positioning reference signal portions that the user equipment is configured to coherently combine; or a maximum time separation between any consecutive-in-time pair of the second plurality of positioning reference signal portions that the user equipment is configured to coherently combine; or a maximum frequency separation between any consecutive-in-frequency pair of the second plurality of positioning reference signal portions that the user equipment is configured to coherently combine; or a maximum frequency span of the second plurality of positioning reference signal portions that the user equipment is configured to coherently combine; or which of the first plurality of positioning reference signal portions include the second plurality of positioning reference signal portions.

Also or alternatively, implementations of the method may include one or more of the following features. The method includes transmitting the capability message, and the processing capability is that the user equipment is configured to process the one or more of the first plurality of positioning reference signal portions separately. The method includes transmitting the signal-combination indication including a bitmap indicating the second plurality of positioning reference signal portions. The method includes transmitting the position information to the network entity, and the position information includes: a time of arrival; and an indication of one or more of the one or more first plurality of positioning reference signal portions processed by the user equipment to determine the time of arrival. The position information includes: a plurality of times of arrival; and a plurality of portion indications each indicating the one or more of the one or more first plurality of positioning reference signal portions processed by the user equipment to determine a corresponding one of the plurality of times of arrival.

Also or alternatively, implementations of the method may include one or more of the following features. The method includes transmitting the position information to the network entity, and the position information includes: a time of arrival; and an accuracy indication indicating an accuracy of the time of arrival.

A non-transitory, processor-readable storage medium includes processor-readable instructions configured to cause a processor, in order to facilitate position determination of a user equipment, to: receive, at the user equipment, a first plurality of positioning reference signal portions having a corresponding plurality of frequency sub-bands; process, at the user equipment, one or more of the first plurality of positioning reference signal portions to determine position information; and at least one of: transmit a capability message, to a network entity, indicating a processing capability of the processor to process, in combination, positioning reference signal portions having different frequency sub-bands to determine the position information; or transmit a signal-combination indication, to the network entity, indicating a second plurality of positioning reference signal portions, of the first plurality of positioning reference signal portions, processed by the processor in combination to determine the position information.

Implementations of such a storage medium may include one of more of the following features. The instructions configured to cause the processor to process the one or more of the first plurality of positioning reference signal portions include instructions configured to cause the processor to coherently combining all of the first plurality of positioning reference signal portions to determine the position information. The instructions configured to cause the processor to process the one or more of the first plurality of positioning reference signal portions include instructions configured to cause the processor to coherently combining fewer than all of the first plurality of positioning reference signal portions. The instructions include instructions configured to cause the processor to transmit the capability message, the processing capability is that the processor can process the second plurality of positioning reference signal portions in combination, and the capability message includes one or more criteria regarding the second plurality of positioning reference signal portions.

DETAILED DESCRIPTION

Figure 1:
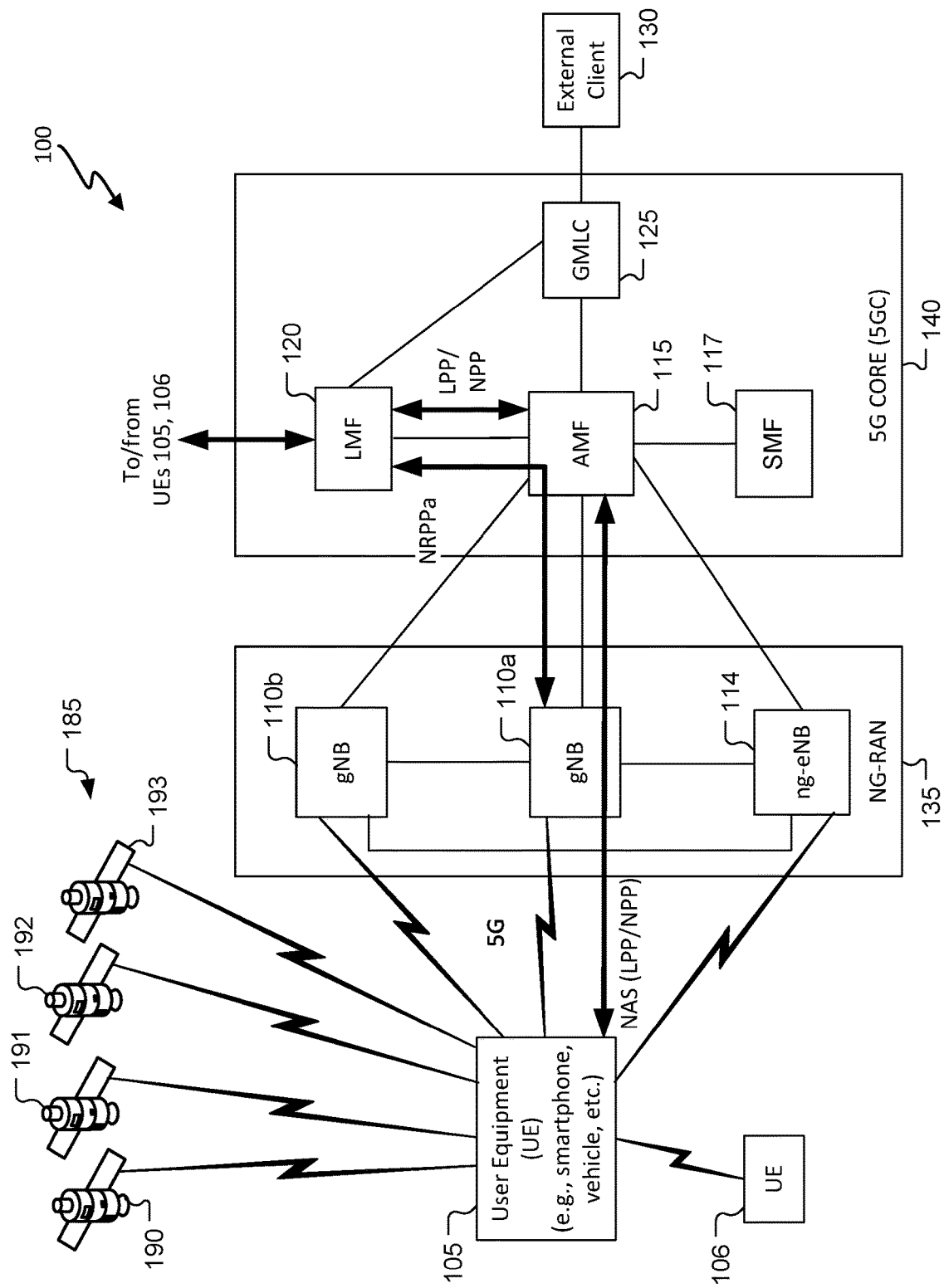
FIG. 1 is a simplified diagram of an example wireless communications system.

Techniques are discussed herein for managing positioning signal processing. For example, a user equipment (UE) may provide one or more indications of processing capability of the UE for processing positioning reference signals (PRS). Processing capabilities may be indicated for different capabilities of combined processing of PRS portions (portions of one or more PRS signals) having different sub-bands. For example, the UE may indicate that the UE will process PRS portions of different component carriers separately. As another example, the UE may indicate that the UE can process all PRS frequency portions of one or more frequency-hopped PRS in combination, e.g., by coherently combining the PRS portions such that all frequencies of the PRS are processed. As another example, the UE may indicate that the UE may process multiple frequency-hopped PRS portions in combination. The UE may indicate one or more criteria for multiple frequency-hopped PRS portions to meet in order to be processed in combination by the UE. The one or more criteria may include, for example, a quantity of PRS portions, a frequency span of the PRS portions, a maximum frequency gap (e.g., maximum number of sub-bands) between PRS portions, a maximum time gap (e.g., in symbols) between PRS portions, a requirement that PRS portions be adjacent in frequency, a requirement that PRS portions be adjacent in time (e.g., in consecutive symbols). These are examples, and other examples (of UEs and/or criteria) may be implemented.

Items and/or techniques described herein may provide one or more of the following capabilities, as well as other capabilities not mentioned. Time to determine positioning signal measurements may be reduced. Mobile device position determination accuracy may be increased, e.g., lateral (horizontal) and/or vertical (altitude) position. Latency in determining positioning signal measurements and mobile device position may be reduced. Position scheduling accuracy may be increased, e.g., improving scheduled availability of position information based on latency. An ability to determine (e.g., anticipate) satisfaction of one or more positioning requirements may be improved. Other capabilities may be provided and not every implementation according to the disclosure must provide any, let alone all, of the capabilities discussed.

The description may refer to sequences of actions to be performed, for example, by elements of a computing device. Various actions described herein can be performed by specific circuits (e.g., an application specific integrated circuit (ASIC)), by program instructions being executed by one or more processors, or by a combination of both. Sequences of actions described herein may be embodied within a non-transitory computer-readable medium having stored thereon a corresponding set of computer instructions that upon execution would cause an associated processor to perform the functionality described herein. Thus, the various aspects described herein may be embodied in a number of different forms, all of which are within the scope of the disclosure, including claimed subject matter.

As used herein, the terms "user equipment" (UE) and "base station" are not specific to or otherwise limited to any particular Radio Access Technology (RAT), unless otherwise noted. In general, such UEs may be any wireless communication device (e.g., a mobile phone, router, tablet computer, laptop computer, consumer asset tracking device, Internet of Things (IoT) device, etc.) used by a user to communicate over a wireless communications network. A UE may be mobile or may (e.g., at certain times) be stationary, and may communicate with a Radio Access Network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, WiFi networks (e.g., based on IEEE 802.11, etc.) and so on.

A base station may operate according to one of several RATs in communication with UEs depending on the network in which it is deployed, and may be alternatively referred to as an Access Point (AP), a Network Node, a NodeB, an evolved NodeB (eNB), a general Node B (gNodeB, gNB), etc. In addition, in some systems a base station may provide purely edge node signaling functions while in other systems it may provide additional control and/or network management functions.

UEs may be embodied by any of a number of types of devices including but not limited to printed circuit (PC) cards, compact flash devices, external or internal modems, wireless or wireline phones, smartphones, tablets, consumer asset tracking devices, asset tags, and so on. A communication link through which UEs can send signals to a RAN is called an uplink channel (e.g., a reverse traffic channel, a reverse control channel, an access channel, etc.). A communication link through which the RAN can send signals to UEs is called a downlink or forward link channel (e.g., a paging channel, a control channel, a broadcast channel, a forward traffic channel, etc.). As used herein the term traffic channel (TCH) can refer to either an uplink/reverse or downlink/forward traffic channel As used herein, the term "cell" or "sector" may correspond to one of a plurality of cells of a base station, or to the base station itself, depending on the context. The term "cell" may refer to a logical communication entity used for communication with a base station (for example, over a carrier), and may be associated with an identifier for distinguishing neighboring cells (for example, a physical cell identifier (PCID), a virtual cell identifier (VCID)) operating via the same or a different carrier. In some examples, a carrier may support multiple cells, and different cells may be configured according to different protocol types (for example, machine-type communication (MTC), narrowband Internet-of-Things (NB-IoT), enhanced mobile broadband (eMBB), or others) that may provide access for different types of devices. In some examples, the term "cell" may refer to a portion of a geographic coverage area (for example, a sector) over which the logical entity operates.

Referring to FIG. 1, an example of a communication system 100 includes a UE 105, a UE 106, a Radio Access Network (RAN) 135, here a Fifth Generation (5G) Next Generation (NG) RAN (NG-RAN), and a 5G Core Network (5GC) 140. The UE 105 and/or the UE 106 may be, e.g., an IoT device, a location tracker device, a cellular telephone, a vehicle (e.g., a car, a truck, a bus, a boat, etc.), or other device. A 5G network may also be referred to as a New Radio (NR) network; NG-RAN 135 may be referred to as a 5G RAN or as an NR RAN; and 5GC 140 may be referred to as an NG Core network (NGC). Standardization of an NG-RAN and 5GC is ongoing in the 3rd Generation Partnership Project (3GPP). Accordingly, the NG-RAN 135 and the 5GC 140 may conform to current or future standards for 5G support from 3GPP. The RAN 135 may be another type of RAN, e.g., a 3G RAN, a 4G Long Term Evolution (LTE) RAN, etc. The UE 106 may be configured and coupled similarly to the UE 105 to send and/or receive signals to/from similar other entities in the system 100, but such signaling is not indicated in FIG. 1 for the sake of simplicity of the figure. Similarly, the discussion focuses on the UE 105 for the sake of simplicity. The communication system 100 may utilize information from a constellation 185 of satellite vehicles (SVs) 190, 191, 192, 193 for a Satellite Positioning System (SPS) (e.g., a Global Navigation Satellite System (GNSS)) like the Global Positioning System (GPS), the Global Navigation Satellite System (GLONASS), Galileo, or Beidou or some other local or regional SPS such as the Indian Regional Navigational Satellite System (IRNSS), the European Geostationary Navigation Overlay Service (EGNOS), or the Wide Area Augmentation System (WAAS). Additional components of the communication system 100 are described below. The communication system 100 may include additional or alternative components.

As shown in FIG. 1, the NG-RAN 135 includes NR nodeBs (gNBs) 110a, 110b, and a next generation eNodeB (ng-eNB) 114, and the 5GC 140 includes an Access and Mobility Management Function (AMF) 115, a Session Management Function (SMF) 117, a Location Management Function (LMF) 120, and a Gateway Mobile Location Center (GMLC) 125. The gNBs 110a, 110b and the ng-eNB 114 are communicatively coupled to each other, are each configured to bi-directionally wirelessly communicate with the UE 105, and are each communicatively coupled to, and configured to bi-directionally communicate with, the AMF 115. The gNBs 110a, 110b, and the ng-eNB 114 may be referred to as base stations (BSs). The AMF 115, the SMF 117, the LMF 120, and the GMLC 125 are communicatively coupled to each other, and the GMLC is communicatively coupled to an external client 130. The SMF 117 may serve as an initial contact point of a Service Control Function (SCF) (not shown) to create, control, and delete media sessions. The BSs 110a, 110b, 114 may be a macro cell (e.g., a high-power cellular base station), or a small cell (e.g., a low-power cellular base station), or an access point (e.g., a short-range base station configured to communicate with short-range technology such as WiFi, WiFi-Direct (WiFi-D), Bluetooth®, Bluetooth®-low energy (BLE), Zigbee, etc. One or more of the BSs 110a, 110b, 114 may be configured to communicate with the UE 105 via multiple carriers. Each of the BSs 110a, 110b, 114 may provide communication coverage for a respective geographic region, e.g. a cell. Each cell may be partitioned into multiple sectors as a function of the base station antennas.

FIG. 1 provides a generalized illustration of various components, any or all of which may be utilized as appropriate, and each of which may be duplicated or omitted as necessary. Specifically, although one UE 105 is illustrated, many UEs (e.g., hundreds, thousands, millions, etc.) may be utilized in the communication system 100. Similarly, the communication system 100 may include a larger (or smaller) number of SVs (i.e., more or fewer than the four SVs 190-193 shown), gNBs 110a, 110b, ng-eNBs 114, AMFs 115, external clients 130, and/or other components. The illustrated connections that connect the various components in the communication system 100 include data and signaling connections which may include additional (intermediary) components, direct or indirect physical and/or wireless connections, and/or additional networks. Furthermore, components may be rearranged, combined, separated, substituted, and/or omitted, depending on desired functionality.

While FIG. 1 illustrates a 5G-based network, similar network implementations and configurations may be used for other communication technologies, such as 3G, Long Term Evolution (LTE), etc. Implementations described herein (be they for 5G technology and/or for one or more other communication technologies and/or protocols) may be used to transmit (or broadcast) directional synchronization signals, receive and measure directional signals at UEs (e.g., the UE 105) and/or provide location assistance to the UE 105 (via the GMLC 125 or other location server) and/or compute a location for the UE 105 at a location-capable device such as the UE 105, the gNB 110a, 110b, or the LMF 120 based on measurement quantities received at the UE 105 for such directionally-transmitted signals. The gateway mobile location center (GMLC) 125, the location management function (LMF) 120, the access and mobility management function (AMF) 115, the SMF 117, the ng-eNB (eNodeB) 114 and the gNBs (gNodeBs) 110a, 110b are examples and may, in various embodiments, be replaced by or include various other location server functionality and/or base station functionality respectively.

The system 100 is capable of wireless communication in that components of the system 100 can communicate with one another (at least some times using wireless connections) directly or indirectly, e.g., via the BSs 110a, 110b, 114 and/or the network 140 (and/or one or more other devices not shown, such as one or more other base transceiver stations). For indirect communications, the communications may be altered during transmission from one entity to another, e.g., to alter header information of data packets, to change format, etc. The UE 105 may include multiple UEs and may be a mobile wireless communication device, but may communicate wirelessly and via wired connections. The UE 105 may be any of a variety of devices, e.g., a smartphone, a tablet computer, a vehicle-based device, etc., but these are examples as the UE 105 is not required to be any of these configurations, and other configurations of UEs may be used. Other UEs may include wearable devices (e.g., smart watches, smart jewelry, smart glasses or headsets, etc.). Still other UEs may be used, whether currently existing or developed in the future. Further, other wireless devices (whether mobile or not) may be implemented within the system 100 and may communicate with each other and/or with the UE 105, the BSs 110a, 110b, 114, the core network 140, and/or the external client 130. For example, such other devices may include internet of thing (IoT) devices, medical devices, home entertainment and/or automation devices, etc. The core network 140 may communicate with the external client 130 (e.g., a computer system), e.g., to allow the external client 130 to request and/or receive location information regarding the UE 105 (e.g., via the GMLC 125).

The UE 105 or other devices may be configured to communicate in various networks and/or for various purposes and/or using various technologies (e.g., 5G, Wi-Fi communication, multiple frequencies of Wi-Fi communication, satellite positioning, one or more types of communications (e.g., GSM (Global System for Mobiles), CDMA (Code Division Multiple Access), LTE (Long-Term Evolution), V2X (Vehicle-to-Everything, e.g., V2P (Vehicle-to-Pedestrian), V2I (Vehicle-to-Infrastructure), V2V (Vehicle-to-Vehicle), etc.), IEEE 802.11p, etc.). V2X communications may be cellular (Cellular-V2X (C-V2X)) and/or WiFi (e.g., DSRC (Dedicated Short-Range Connection)). The system 100 may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot, overhead information, data, etc. The UEs 105, 106 may communicate with each other through UE-to-UE sidelink (SL) communications by transmitting over one or more sidelink channels such as a physical sidelink synchronization channel (PSSCH), a physical sidelink broadcast channel (PSBCH), or a physical sidelink control channel (PSCCH).

The UE 105 may comprise and/or may be referred to as a device, a mobile device, a wireless device, a mobile terminal, a terminal, a mobile station (MS), a Secure User Plane Location (SUPL) Enabled Terminal (SET), or by some other name. Moreover, the UE 105 may correspond to a cellphone, smartphone, laptop, tablet, PDA, consumer asset tracking device, navigation device, Internet of Things (IoT) device, health monitors, security systems, smart city sensors, smart meters, wearable trackers, or some other portable or moveable device. Typically, though not necessarily, the UE 105 may support wireless communication using one or more Radio Access Technologies (RATs) such as Global System for Mobile communication (GSM), Code Division Multiple Access (CDMA), Wideband CDMA (WCDMA), LTE, High Rate Packet Data (HRPD), IEEE 802.11 WiFi (also referred to as Wi-Fi), Bluetooth® (BT), Worldwide Interoperability for Microwave Access (WiMAX), 5G new radio (NR) (e.g., using the NG-RAN 135 and the 5GC 140), etc. The UE 105 may support wireless communication using a Wireless Local Area Network (WLAN) which may connect to other networks (e.g., the Internet) using a Digital Subscriber Line (DSL) or packet cable, for example. The use of one or more of these RATs may allow the UE 105 to communicate with the external client 130 (e.g., via elements of the 5GC 140 not shown in FIG. 1, or possibly via the GMLC 125) and/or allow the external client 130 to receive location information regarding the UE 105 (e.g., via the GMLC 125).

The UE 105 may include a single entity or may include multiple entities such as in a personal area network where a user may employ audio, video and/or data I/O (input/output) devices and/or body sensors and a separate wireline or wireless modem. An estimate of a location of the UE 105 may be referred to as a location, location estimate, location fix, fix, position, position estimate, or position fix, and may be geographic, thus providing location coordinates for the UE 105 (e.g., latitude and longitude) which may or may not include an altitude component (e.g., height above sea level, height above or depth below ground level, floor level, or basement level). Alternatively, a location of the UE 105 may be expressed as a civic location (e.g., as a postal address or the designation of some point or small area in a building such as a particular room or floor). A location of the UE 105 may be expressed as an area or volume (defined either geographically or in civic form) within which the UE 105 is expected to be located with some probability or confidence level (e.g., 67%, 95%, etc.). A location of the UE 105 may be expressed as a relative location comprising, for example, a distance and direction from a known location. The relative location may be expressed as relative coordinates (e.g., X, Y (and Z) coordinates) defined relative to some origin at a known location which may be defined, e.g., geographically, in civic terms, or by reference to a point, area, or volume, e.g., indicated on a map, floor plan, or building plan. In the description contained herein, the use of the term location may comprise any of these variants unless indicated otherwise. When computing the location of a UE, it is common to solve for local x, y, and possibly z coordinates and then, if desired, convert the local coordinates into absolute coordinates (e.g., for latitude, longitude, and altitude above or below mean sea level).

The UE 105 may be configured to communicate with other entities using one or more of a variety of technologies. The UE 105 may be configured to connect indirectly to one or more communication networks via one or more device-to-device (D2D) peer-to-peer (P2P) links. The D2D P2P links may be supported with any appropriate D2D radio access technology (RAT), such as LTE Direct (LTE-D), WiFi Direct (WiFi-D), Bluetooth®, and so on. One or more of a group of UEs utilizing D2D communications may be within a geographic coverage area of a Transmission/Reception Point (TRP) such as one or more of the gNBs 110a, 110b, and/or the ng-eNB 114. Other UEs in such a group may be outside such geographic coverage areas, or may be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP. One or more of a group of UEs utilizing D2D communications may be within a geographic coverage area of a TRP. Other UEs in such a group may be outside such geographic coverage areas, or be otherwise unable to receive transmissions from a base station. Groups of UEs communicating via D2D communications may utilize a one-to-many (1:M) system in which each UE may transmit to other UEs in the group. A TRP may facilitate scheduling of resources for D2D communications. In other cases, D2D communications may be carried out between UEs without the involvement of a TRP.

Base stations (BSs) in the NG-RAN 135 shown in FIG. 1 include NR Node Bs, referred to as the gNBs 110a and 110b. Pairs of the gNBs 110a, 110b in the NG-RAN 135 may be connected to one another via one or more other gNBs. Access to the 5G network is provided to the UE 105 via wireless communication between the UE 105 and one or more of the gNBs 110a, 110b, which may provide wireless communications access to the 5GC 140 on behalf of the UE 105 using 5G. In FIG. 1, the serving gNB for the UE 105 is assumed to be the gNB 110a, although another gNB (e.g. the gNB 110b) may act as a serving gNB if the UE 105 moves to another location or may act as a secondary gNB to provide additional throughput and bandwidth to the UE 105.

Base stations (BSs) in the NG-RAN 135 shown in FIG. 1 may include the ng-eNB 114, also referred to as a next generation evolved Node B. The ng-eNB 114 may be connected to one or more of the gNBs 110a, 110b in the NG-RAN 135, possibly via one or more other gNBs and/or one or more other ng-eNBs. The ng-eNB 114 may provide LTE wireless access and/or evolved LTE (eLTE) wireless access to the UE 105. One or more of the gNBs 110a, 110b and/or the ng-eNB 114 may be configured to function as positioning-only beacons which may transmit signals to assist with determining the position of the UE 105 but may not receive signals from the UE 105 or from other UEs.

The BSs 110a, 110b, 114 may each comprise one or more TRPs. For example, each sector within a cell of a BS may comprise a TRP, although multiple TRPs may share one or more components (e.g., share a processor but have separate antennas). The system 100 may include macro TRPs exclusively or the system 100 may have TRPs of different types, e.g., macro, pico, and/or femto TRPs, etc. A macro TRP may cover a relatively large geographic area (e.g., several kilometers in radius) and may allow unrestricted access by terminals with service subscription. A pico TRP may cover a relatively small geographic area (e.g., a pico cell) and may allow unrestricted access by terminals with service subscription. A femto or home TRP may cover a relatively small geographic area (e.g., a femto cell) and may allow restricted access by terminals having association with the femto cell (e.g., terminals for users in a home).

As noted, while FIG. 1 depicts nodes configured to communicate according to 5G communication protocols, nodes configured to communicate according to other communication protocols, such as, for example, an LTE protocol or IEEE 802.11x protocol, may be used. For example, in an Evolved Packet System (EPS) providing LTE wireless access to the UE 105, a RAN may comprise an Evolved Universal Mobile Telecommunications System (UMTS) Terrestrial Radio Access Network (E-UTRAN) which may comprise base stations comprising evolved Node Bs (eNBs). A core network for EPS may comprise an Evolved Packet Core (EPC). An EPS may comprise an E-UTRAN plus EPC, where the E-UTRAN corresponds to the NG-RAN 135 and the EPC corresponds to the 5GC 140 in FIG. 1.

The gNBs 110a, 110b and the ng-eNB 114 may communicate with the AMF 115, which, for positioning functionality, communicates with the LMF 120. The AMF 115 may support mobility of the UE 105, including cell change and handover and may participate in supporting a signaling connection to the UE 105 and possibly data and voice bearers for the UE 105. The LMF 120 may communicate directly with the UE 105, e.g., through wireless communications, or directly with the BSs 110a, 110b, 114. The LMF 120 may support positioning of the UE 105 when the UE 105 accesses the NG-RAN 135 and may support position procedures/methods such as Assisted GNSS (A-GNSS), Observed Time Difference of Arrival (OTDOA) (e.g., Downlink (DL) OTDOA or Uplink (UL) OTDOA), Round Trip Time (RTT), Multi-Cell RTT, Real Time Kinematics (RTK), Precise Point Positioning (PPP), Differential GNSS (DGNSS), Enhanced Cell ID (E-CID), angle of arrival (AoA), angle of departure (AoD), and/or other position methods. The LMF 120 may process location services requests for the UE 105, e.g., received from the AMF 115 or from the GMLC 125. The LMF 120 may be connected to the AMF 115 and/or to the GMLC 125. The LMF 120 may be referred to by other names such as a Location Manager (LM), Location Function (LF), commercial LMF (CLMF), or value added LMF (VLMF). A node/system that implements the LMF 120 may additionally or alternatively implement other types of location-support modules, such as an Enhanced Serving Mobile Location Center (E-SMLC) or a Secure User Plane Location (SUPL) Location Platform (SLP). At least part of the positioning functionality (including derivation of the location of the UE 105) may be performed at the UE 105 (e.g., using signal measurements obtained by the UE 105 for signals transmitted by wireless nodes such as the gNBs 110a, 110b and/or the ng-eNB 114, and/or assistance data provided to the UE 105, e.g. by the LMF 120). The AMF 115 may serve as a control node that processes signaling between the UE 105 and the core network 140, and may provide QoS (Quality of Service) flow and session management. The AMF 115 may support mobility of the UE 105 including cell change and handover and may participate in supporting signaling connection to the UE 105.

The GMLC 125 may support a location request for the UE 105 received from the external client 130 and may forward such a location request to the AMF 115 for forwarding by the AMF 115 to the LMF 120 or may forward the location request directly to the LMF 120. A location response from the LMF 120 (e.g., containing a location estimate for the UE 105) may be returned to the GMLC 125 either directly or via the AMF 115 and the GMLC 125 may then return the location response (e.g., containing the location estimate) to the external client 130. The GMLC 125 is shown connected to both the AMF 115 and LMF 120, though may not be connected to the AMF 115 or the LMF 120 in some implementations.

As further illustrated in FIG. 1, the LMF 120 may communicate with the gNBs 110a, 110b and/or the ng-eNB 114 using a New Radio Position Protocol A (which may be referred to as NPPa or NRPPa), which may be defined in 3GPP Technical Specification (TS) 38.455. NRPPa may be the same as, similar to, or an extension of the LTE Positioning Protocol A (LPPa) defined in 3GPP TS 36.455, with NRPPa messages being transferred between the gNB 110a (or the gNB 110b) and the LMF 120, and/or between the ng-eNB 114 and the LMF 120, via the AMF 115. As further illustrated in FIG. 1, the LMF 120 and the UE 105 may communicate using an LTE Positioning Protocol (LPP), which may be defined in 3GPP TS 36.355. The LMF 120 and the UE 105 may also or instead communicate using a New Radio Positioning Protocol (which may be referred to as NPP or NRPP), which may be the same as, similar to, or an extension of LPP. Here, LPP and/or NPP messages may be transferred between the UE 105 and the LMF 120 via the AMF 115 and the serving gNB 110a, 110b or the serving ng-eNB 114 for the UE 105. For example, LPP and/or NPP messages may be transferred between the LMF 120 and the AMF 115 using a 5G Location Services Application Protocol (LCS AP) and may be transferred between the AMF 115 and the UE 105 using a 5G Non-Access Stratum (NAS) protocol. The LPP and/or NPP protocol may be used to support positioning of the UE 105 using UE-assisted and/or UE-based position methods such as A-GNSS, RTK, OTDOA and/or E-CID. The NRPPa protocol may be used to support positioning of the UE 105 using network-based position methods such as E-CID (e.g., when used with measurements obtained by the gNB 110a, 110b or the ng-eNB 114) and/or may be used by the LMF 120 to obtain location related information from the gNBs 110a, 110b and/or the ng-eNB 114, such as parameters defining directional SS transmissions from the gNBs 110a, 110b, and/or the ng-eNB 114. The LMF 120 may be co-located or integrated with a gNB or a TRP, or may be disposed remote from the gNB and/or the TRP and configured to communicate directly or indirectly with the gNB and/or the TRP.

With a UE-assisted position method, the UE 105 may obtain location measurements and send the measurements to a location server (e.g., the LMF 120) for computation of a location estimate for the UE 105. For example, the location measurements may include one or more of a Received Signal Strength Indication (RSSI), Round Trip signal propagation Time (RTT), Reference Signal Time Difference (RSTD), Reference Signal Received Power (RSRP) and/or Reference Signal Received Quality (RSRQ) for the gNBs 110a, 110b, the ng-eNB 114, and/or a WLAN AP. The location measurements may also or instead include measurements of GNSS pseudorange, code phase, and/or carrier phase for the SVs 190-193.

With a UE-based position method, the UE 105 may obtain location measurements (e.g., which may be the same as or similar to location measurements for a UE-assisted position method) and may compute a location of the UE 105 (e.g., with the help of assistance data received from a location server such as the LMF 120 or broadcast by the gNBs 110a, 110b, the ng-eNB 114, or other base stations or APs).

With a network-based position method, one or more base stations (e.g., the gNBs 110a, 110b, and/or the ng-eNB 114) or APs may obtain location measurements (e.g., measurements of RSSI, RTT, RSRP, RSRQ or Time of Arrival (ToA) for signals transmitted by the UE 105) and/or may receive measurements obtained by the UE 105. The one or more base stations or APs may send the measurements to a location server (e.g., the LMF 120) for computation of a location estimate for the UE 105.

Information provided by the gNBs 110a, 110b, and/or the ng-eNB 114 to the LMF 120 using NRPPa may include timing and configuration information for directional SS transmissions and location coordinates. The LMF 120 may provide some or all of this information to the UE 105 as assistance data in an LPP and/or NPP message via the NG-RAN 135 and the 5GC 140.

An LPP or NPP message sent from the LMF 120 to the UE 105 may instruct the UE 105 to do any of a variety of things depending on desired functionality. For example, the LPP or NPP message could contain an instruction for the UE 105 to obtain measurements for GNSS (or A-GNSS), WLAN, E-CID, and/or OTDOA (or some other position method). In the case of E-CID, the LPP or NPP message may instruct the UE 105 to obtain one or more measurement quantities (e.g., beam ID, beam width, mean angle, RSRP, RSRQ measurements) of directional signals transmitted within particular cells supported by one or more of the gNBs 110a, 110b, and/or the ng-eNB 114 (or supported by some other type of base station such as an eNB or WiFi AP). The UE 105 may send the measurement quantities back to the LMF 120 in an LPP or NPP message (e.g., inside a 5G NAS message) via the serving gNB 110a (or the serving ng-eNB 114) and the AMF 115.

As noted, while the communication system 100 is described in relation to 5G technology, the communication system 100 may be implemented to support other communication technologies, such as GSM, WCDMA, LTE, etc., that are used for supporting and interacting with mobile devices such as the UE 105 (e.g., to implement voice, data, positioning, and other functionalities). In some such embodiments, the 5GC 140 may be configured to control different air interfaces. For example, the 5GC 140 may be connected to a WLAN using a Non-3GPP InterWorking Function (N3IWF, not shown FIG. 1) in the 5GC 150. For example, the WLAN may support IEEE 802.11 WiFi access for the UE 105 and may comprise one or more WiFi APs. Here, the N3IWF may connect to the WLAN and to other elements in the 5GC 140 such as the AMF 115. In some embodiments, both the NG-RAN 135 and the 5GC 140 may be replaced by one or more other RANs and one or more other core networks. For example, in an EPS, the NG-RAN 135 may be replaced by an E-UTRAN containing eNBs and the 5GC 140 may be replaced by an EPC containing a Mobility Management Entity (MME) in place of the AMF 115, an E-SMLC in place of the LMF 120, and a GMLC that may be similar to the GMLC 125. In such an EPS, the E-SMLC may use LPPa in place of NRPPa to send and receive location information to and from the eNBs in the E-UTRAN and may use LPP to support positioning of the UE 105. In these other embodiments, positioning of the UE 105 using directional PRSs may be supported in an analogous manner to that described herein for a 5G network with the difference that functions and procedures described herein for the gNBs 110a, 110b, the ng-eNB 114, the AMF 115, and the LMF 120 may, in some cases, apply instead to other network elements such eNBs, WiFi APs, an MME, and an E-SMLC.

As noted, in some embodiments, positioning functionality may be implemented, at least in part, using the directional SS beams, sent by base stations (such as the gNBs 110a, 110b, and/or the ng-eNB 114) that are within range of the UE whose position is to be determined (e.g., the UE 105 of FIG. 1). The UE may, in some instances, use the directional SS beams from a plurality of base stations (such as the gNBs 110a, 110b, the ng-eNB 114, etc.) to compute the UE's position.

Figure 2:
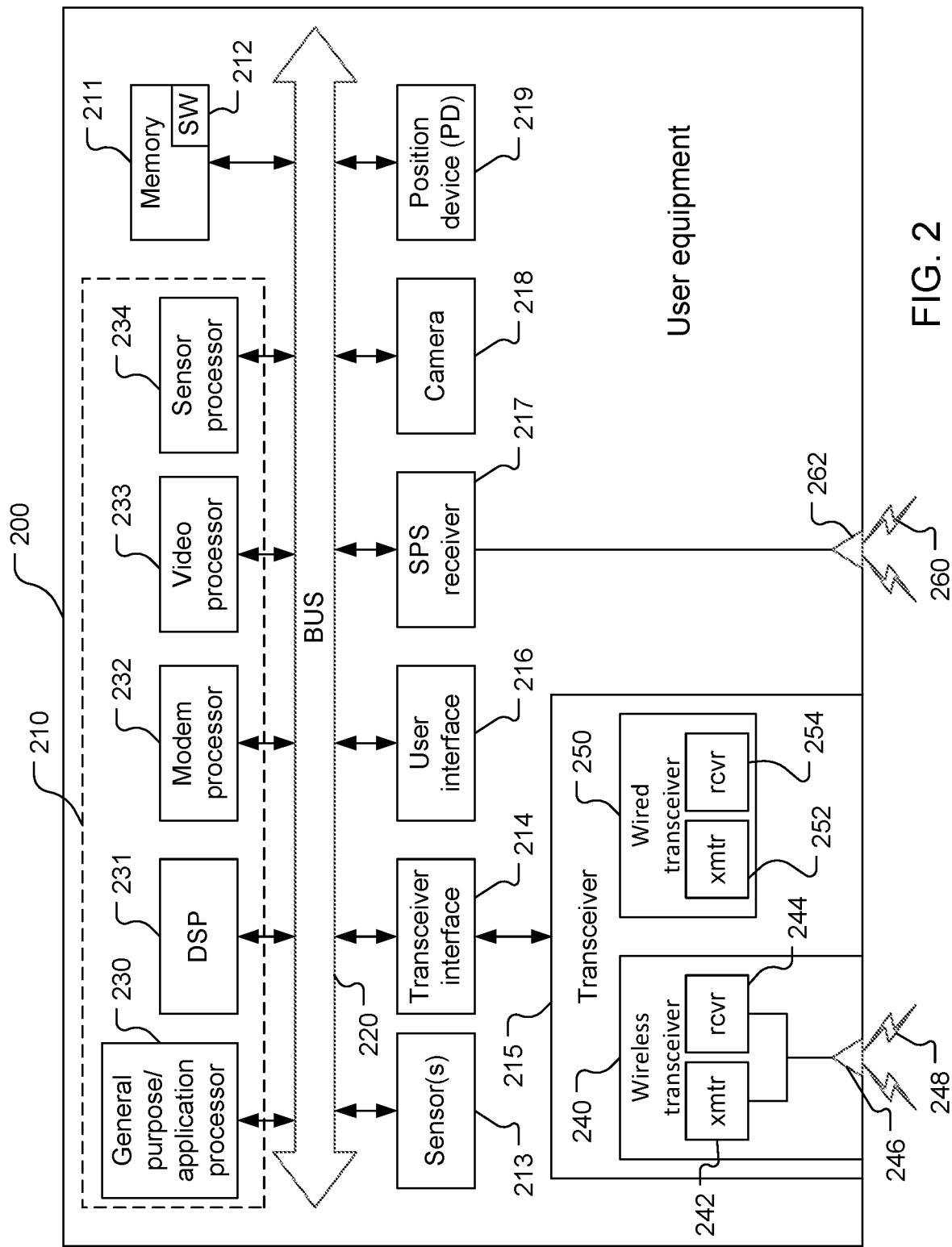
FIG. 2 is a block diagram of components of an example user equipment shown in FIG. 1.

Referring also to FIG. 2, a UE 200 is an example of one of the UEs 105, 106 and comprises a computing platform including a processor 210, memory 211 including software (SW) 212, one or more sensors 213, a transceiver interface 214 for a transceiver 215 (that includes a wireless transceiver 240 and a wired transceiver 250), a user interface 216, a Satellite Positioning System (SPS) receiver 217, a camera 218, and a position device (PD) 219. The processor 210, the memory 211, the sensor(s) 213, the transceiver interface 214, the user interface 216, the SPS receiver 217, the camera 218, and the position device 219 may be communicatively coupled to each other by a bus 220 (which may be configured, e.g., for optical and/or electrical communication). One or more of the shown apparatus (e.g., the camera 218, the position device 219, and/or one or more of the sensor(s) 213, etc.) may be omitted from the UE 200. The processor 210 may include one or more intelligent hardware devices, e.g., a central processing unit (CPU), a microcontroller, an application specific integrated circuit (ASIC), etc. The processor 210 may comprise multiple processors including a general-purpose/application processor 230, a Digital Signal Processor (DSP) 231, a modem processor 232, a video processor 233, and/or a sensor processor 234. One or more of the processors 230-234 may comprise multiple devices (e.g., multiple processors). For example, the sensor processor 234 may comprise, e.g., processors for RF (radio frequency) sensing (with one or more (cellular) wireless signals transmitted and reflection(s) used to identify, map, and/or track an object), and/or ultrasound, etc. The modem processor 232 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 200 for connectivity. The memory 211 is a non-transitory storage medium that may include random access memory (RAM), flash memory, disc memory, and/or read-only memory (ROM), etc. The memory 211 stores the software 212 which may be processor-readable, processor-executable software code containing instructions that are configured to, when executed, cause the processor 210 to perform various functions described herein. Alternatively, the software 212 may not be directly executable by the processor 210 but may be configured to cause the processor 210, e.g., when compiled and executed, to perform the functions. The description may refer to the processor 210 performing a function, but this includes other implementations such as where the processor 210 executes software and/or firmware. The description may refer to the processor 210 performing a function as shorthand for one or more of the processors 230-234 performing the function. The description may refer to the UE 200 performing a function as shorthand for one or more appropriate components of the UE 200 performing the function. The processor 210 may include a memory with stored instructions in addition to and/or instead of the memory 211. Functionality of the processor 210 is discussed more fully below.

The configuration of the UE 200 shown in FIG. 2 is an example and not limiting of the disclosure, including the claims, and other configurations may be used. For example, an example configuration of the UE includes one or more of the processors 230-234 of the processor 210, the memory 211, and the wireless transceiver 240. Other example configurations include one or more of the processors 230-234 of the processor 210, the memory 211, a wireless transceiver, and one or more of the sensor(s) 213, the user interface 216, the SPS receiver 217, the camera 218, the PD 219, and/or a wired transceiver.

The UE 200 may comprise the modem processor 232 that may be capable of performing baseband processing of signals received and down-converted by the transceiver 215 and/or the SPS receiver 217. The modem processor 232 may perform baseband processing of signals to be upconverted for transmission by the transceiver 215. Also or alternatively, baseband processing may be performed by the processor 230 and/or the DSP 231. Other configurations, however, may be used to perform baseband processing.

The UE 200 may include the sensor(s) 213 that may include, for example, one or more of various types of sensors such as one or more inertial sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 200 in three dimensions) and/or one or more gyroscopes (e.g., three-dimensional gyroscope(s)). The sensor(s) 213 may include one or more magnetometers (e.g., three-dimensional magnetometer(s)) to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 213 may generate analog and/or digital signals indications of which may be stored in the memory 211 and processed by the DSP 231 and/or the processor 230 in support of one or more applications such as, for example, applications directed to positioning and/or navigation operations.

The sensor(s) 213 may be used in relative location measurements, relative location determination, motion determination, etc. Information detected by the sensor(s) 213 may be used for motion detection, relative displacement, dead reckoning, sensor-based location determination, and/or sensor-assisted location determination. The sensor(s) 213 may be useful to determine whether the UE 200 is fixed (stationary) or mobile and/or whether to report certain useful information to the LMF 120 regarding the mobility of the UE 200. For example, based on the information obtained/measured by the sensor(s) 213, the UE 200 may notify/report to the LMF 120 that the UE 200 has detected movements or that the UE 200 has moved, and report the relative displacement/distance (e.g., via dead reckoning, or sensor-based location determination, or sensor-assisted location determination enabled by the sensor(s) 213). In another example, for relative positioning information, the sensors/IMU can be used to determine the angle and/or orientation of the other device with respect to the UE 200, etc.

The IMU may be configured to provide measurements about a direction of motion and/or a speed of motion of the UE 200, which may be used in relative location determination. For example, one or more accelerometers and/or one or more gyroscopes of the IMU may detect, respectively, a linear acceleration and a speed of rotation of the UE 200. The linear acceleration and speed of rotation measurements of the UE 200 may be integrated over time to determine an instantaneous direction of motion as well as a displacement of the UE 200. The instantaneous direction of motion and the displacement may be integrated to track a location of the UE 200. For example, a reference location of the UE 200 may be determined, e.g., using the SPS receiver 217 (and/or by some other means) for a moment in time and measurements from the accelerometer(s) and gyroscope(s) taken after this moment in time may be used in dead reckoning to determine present location of the UE 200 based on movement (direction and distance) of the UE 200 relative to the reference location.

The magnetometer(s) may determine magnetic field strengths in different directions which may be used to determine orientation of the UE 200. For example, the orientation may be used to provide a digital compass for the UE 200. The magnetometer(s) may include a two-dimensional magnetometer configured to detect and provide indications of magnetic field strength in two orthogonal dimensions. The magnetometer(s) may include a three-dimensional magnetometer configured to detect and provide indications of magnetic field strength in three orthogonal dimensions. The magnetometer(s) may provide means for sensing a magnetic field and providing indications of the magnetic field, e.g., to the processor 210.

The transceiver 215 may include a wireless transceiver 240 and a wired transceiver 250 configured to communicate with other devices through wireless connections and wired connections, respectively. For example, the wireless transceiver 240 may include a wireless transmitter 242 and a wireless receiver 244 coupled to one or more antennas 246 for transmitting (e.g., on one or more uplink channels and/or one or more sidelink channels) and/or receiving (e.g., on one or more downlink channels and/or one or more sidelink channels) wireless signals 248 and transducing signals from the wireless signals 248 to wired (e.g., electrical and/or optical) signals and from wired (e.g., electrical and/or optical) signals to the wireless signals 248. Thus, the wireless transmitter 242 may include multiple transmitters that may be discrete components or combined/integrated components, and/or the wireless receiver 244 may include multiple receivers that may be discrete components or combined/integrated components. The wireless transceiver 240 may be configured to communicate signals (e.g., with TRPs and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHz frequencies. The wired transceiver 250 may include a wired transmitter 252 and a wired receiver 254 configured for wired communication, e.g., a network interface that may be utilized to communicate with the network 135 to send communications to, and receive communications from, the network 135. The wired transmitter 252 may include multiple transmitters that may be discrete components or combined/integrated components, and/or the wired receiver 254 may include multiple receivers that may be discrete components or combined/integrated components. The wired transceiver 250 may be configured, e.g., for optical communication and/or electrical communication. The transceiver 215 may be communicatively coupled to the transceiver interface 214, e.g., by optical and/or electrical connection. The transceiver interface 214 may be at least partially integrated with the transceiver 215.

The user interface 216 may comprise one or more of several devices such as, for example, a speaker, microphone, display device, vibration device, keyboard, touch screen, etc. The user interface 216 may include more than one of any of these devices. The user interface 216 may be configured to enable a user to interact with one or more applications hosted by the UE 200. For example, the user interface 216 may store indications of analog and/or digital signals in the memory 211 to be processed by DSP 231 and/or the general-purpose processor 230 in response to action from a user. Similarly, applications hosted on the UE 200 may store indications of analog and/or digital signals in the memory 211 to present an output signal to a user. The user interface 216 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 216 may comprise one or more touch sensors responsive to touching and/or pressure, e.g., on a keyboard and/or touch screen of the user interface 216.

The SPS receiver 217 (e.g., a Global Positioning System (GPS) receiver) may be capable of receiving and acquiring SPS signals 260 via an SPS antenna 262. The antenna 262 is configured to transduce the wireless SPS signals 260 to wired signals, e.g., electrical or optical signals, and may be integrated with the antenna 246. The SPS receiver 217 may be configured to process, in whole or in part, the acquired SPS signals 260 for estimating a location of the UE 200. For example, the SPS receiver 217 may be configured to determine location of the UE 200 by trilateration using the SPS signals 260. The general-purpose processor 230, the memory 211, the DSP 231 and/or one or more specialized processors (not shown) may be utilized to process acquired SPS signals, in whole or in part, and/or to calculate an estimated location of the UE 200, in conjunction with the SPS receiver 217. The memory 211 may store indications (e.g., measurements) of the SPS signals 260 and/or other signals (e.g., signals acquired from the wireless transceiver 240) for use in performing positioning operations. The general-purpose processor 230, the DSP 231, and/or one or more specialized processors, and/or the memory 211 may provide or support a location engine for use in processing measurements to estimate a location of the UE 200.

The UE 200 may include the camera 218 for capturing still or moving imagery. The camera 218 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 230 and/or the DSP 231. Also or alternatively, the video processor 233 may perform conditioning, encoding, compression, and/or manipulation of signals representing captured images. The video processor 233 may decode/decompress stored image data for presentation on a display device (not shown), e.g., of the user interface 216.

The position device (PD) 219 may be configured to determine a position of the UE 200, motion of the UE 200, and/or relative position of the UE 200, and/or time. For example, the PD 219 may communicate with, and/or include some or all of, the SPS receiver 217. The PD 219 may work in conjunction with the processor 210 and the memory 211 as appropriate to perform at least a portion of one or more positioning methods, although the description herein may refer to the PD 219 being configured to perform, or performing, in accordance with the positioning method(s). The PD 219 may also or alternatively be configured to determine location of the UE 200 using terrestrial-based signals (e.g., at least some of the signals 248) for trilateration, for assistance with obtaining and using the SPS signals 260, or both. The PD 219 may be configured to use one or more other techniques (e.g., relying on the UE's self-reported location (e.g., part of the UE's position beacon)) for determining the location of the UE 200, and may use a combination of techniques (e.g., SPS and terrestrial positioning signals) to determine the location of the UE 200. The PD 219 may include one or more of the sensors 213 (e.g., gyroscope(s), accelerometer(s), magnetometer(s), etc.) that may sense orientation and/or motion of the UE 200 and provide indications thereof that the processor 210 (e.g., the processor 230 and/or the DSP 231) may be configured to use to determine motion (e.g., a velocity vector and/or an acceleration vector) of the UE 200. The PD 219 may be configured to provide indications of uncertainty and/or error in the determined position and/or motion. Functionality of the PD 219 may be provided in a variety of manners and/or configurations, e.g., by the general purpose/application processor 230, the transceiver 215, the SPS receiver 217, and/or another component of the UE 200, and may be provided by hardware, software, firmware, or various combinations thereof.

Figure 3:
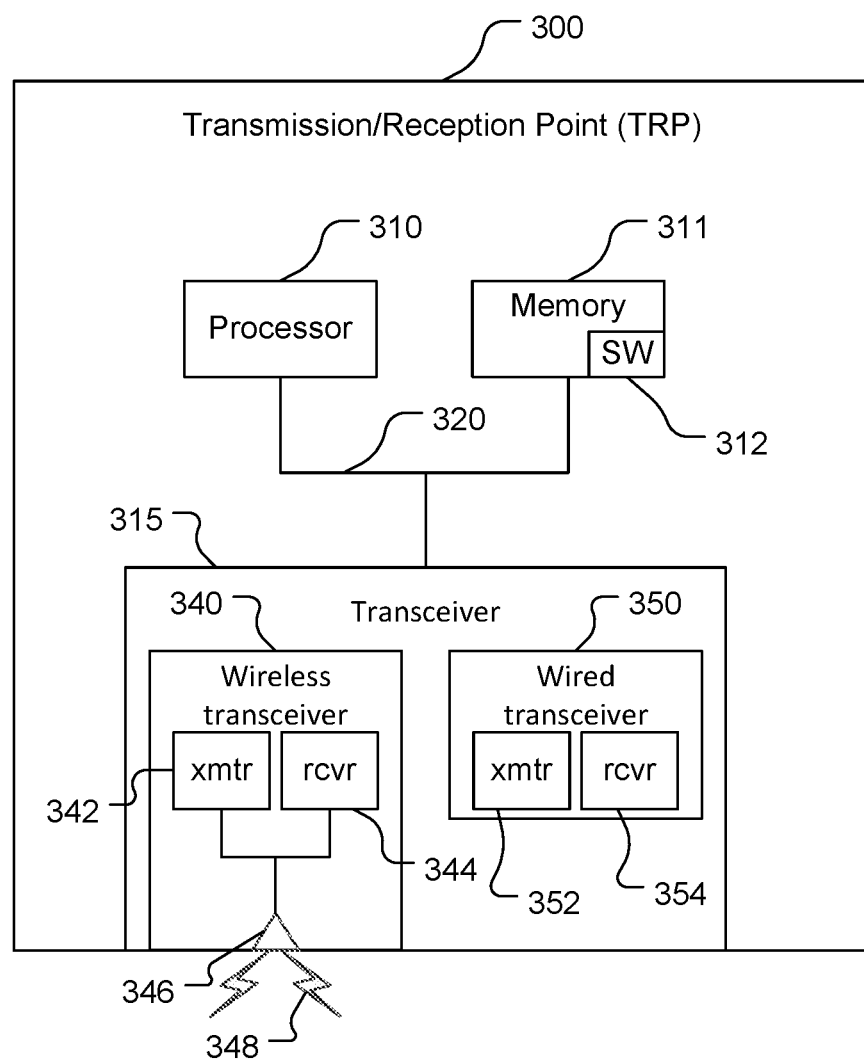
FIG. 3 is a block diagram of components of an example transmission/reception point.

Referring also to FIG. 3, an example of a TRP 300 of the BSs 110a, 110b, 114 comprises a computing platform including a processor 310, memory 311 including software (SW) 312, and a transceiver 315. The processor 310, the memory 311, and the transceiver 315 may be communicatively coupled to each other by a bus 320 (which may be configured, e.g., for optical and/or electrical communication). One or more of the shown apparatus (e.g., a wireless interface) may be omitted from the TRP 300. The processor 310 may include one or more intelligent hardware devices, e.g., a central processing unit (CPU), a microcontroller, an application specific integrated circuit (ASIC), etc. The processor 310 may comprise multiple processors (e.g., including a general-purpose/application processor, a DSP, a modem processor, a video processor, and/or a sensor processor as shown in FIG. 2). The memory 311 is a non-transitory storage medium that may include random access memory (RAM)), flash memory, disc memory, and/or read-only memory (ROM), etc. The memory 311 stores the software 312 which may be processor-readable, processor-executable software code containing instructions that are configured to, when executed, cause the processor 310 to perform various functions described herein. Alternatively, the software 312 may not be directly executable by the processor 310 but may be configured to cause the processor 310, e.g., when compiled and executed, to perform the functions.

The description may refer to the processor 310 performing a function, but this includes other implementations such as where the processor 310 executes software and/or firmware. The description may refer to the processor 310 performing a function as shorthand for one or more of the processors contained in the processor 310 performing the function. The description may refer to the TRP 300 performing a function as shorthand for one or more appropriate components (e.g., the processor 310 and the memory 311) of the TRP 300 (and thus of one of the BSs 110a, 110b, 114) performing the function. The processor 310 may include a memory with stored instructions in addition to and/or instead of the memory 311. Functionality of the processor 310 is discussed more fully below.

The transceiver 315 may include a wireless transceiver 340 and/or a wired transceiver 350 configured to communicate with other devices through wireless connections and wired connections, respectively. For example, the wireless transceiver 340 may include a wireless transmitter 342 and a wireless receiver 344 coupled to one or more antennas 346 for transmitting (e.g., on one or more uplink channels and/or one or more downlink channels) and/or receiving (e.g., on one or more downlink channels and/or one or more uplink channels) wireless signals 348 and transducing signals from the wireless signals 348 to wired (e.g., electrical and/or optical) signals and from wired (e.g., electrical and/or optical) signals to the wireless signals 348. Thus, the wireless transmitter 342 may include multiple transmitters that may be discrete components or combined/integrated components, and/or the wireless receiver 344 may include multiple receivers that may be discrete components or combined/integrated components. The wireless transceiver 340 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 350 may include a wired transmitter 352 and a wired receiver 354 configured for wired communication, e.g., a network interface that may be utilized to communicate with the network 135 to send communications to, and receive communications from, the LMF 120, for example, and/or one or more other network entities. The wired transmitter 352 may include multiple transmitters that may be discrete components or combined/integrated components, and/or the wired receiver 354 may include multiple receivers that may be discrete components or combined/integrated components. The wired transceiver 350 may be configured, e.g., for optical communication and/or electrical communication.

The configuration of the TRP 300 shown in FIG. 3 is an example and not limiting of the disclosure, including the claims, and other configurations may be used. For example, the description herein discusses that the TRP 300 is configured to perform or performs several functions, but one or more of these functions may be performed by the LMF 120 and/or the UE 200 (i.e., the LMF 120 and/or the UE 200 may be configured to perform one or more of these functions).

Figure 4:
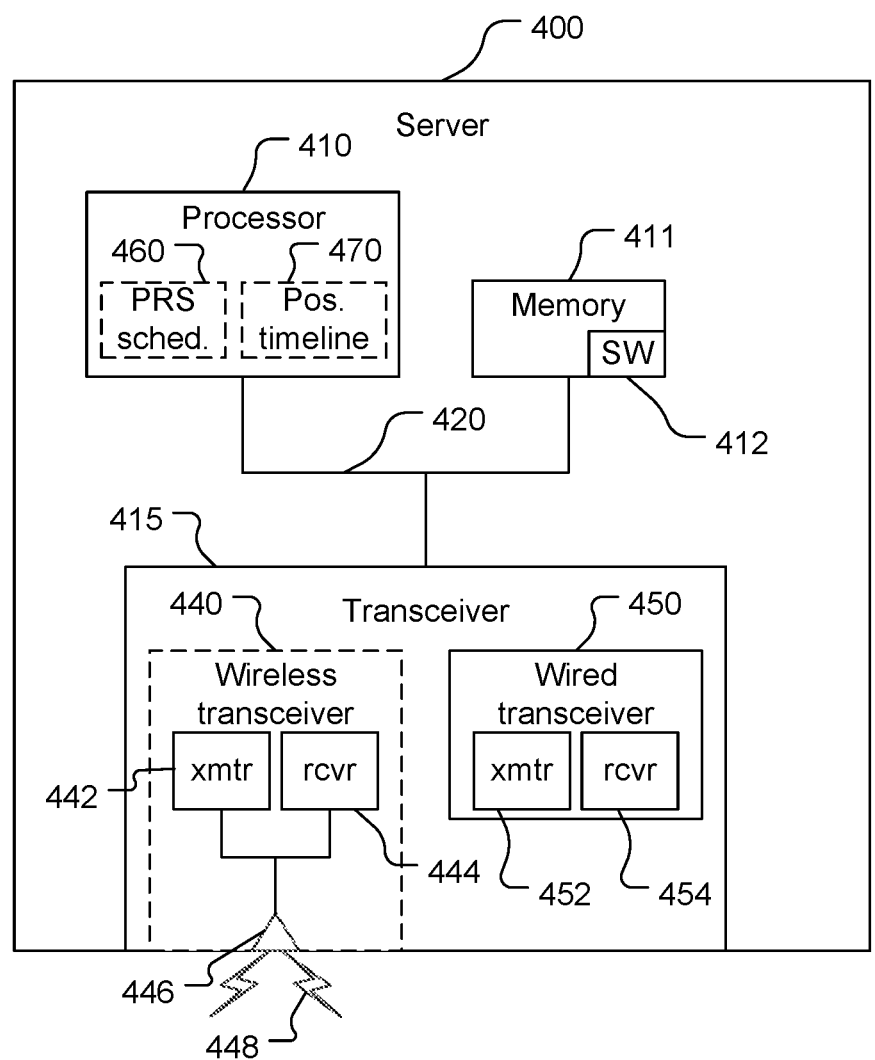
FIG. 4 is a block diagram of components of an example server, various embodiments of which are shown in FIG. 1.

Referring also to FIG. 4, a server 400, of which the LMF 120 is an example, comprises a computing platform including a processor 410, memory 411 including software (SW) 412, and a transceiver 415. The processor 410, the memory 411, and the transceiver 415 may be communicatively coupled to each other by a bus 420 (which may be configured, e.g., for optical and/or electrical communication). One or more of the shown apparatus (e.g., a wireless interface) may be omitted from the server 400. The processor 410 may include one or more intelligent hardware devices, e.g., a central processing unit (CPU), a microcontroller, an application specific integrated circuit (ASIC), etc. The processor 410 may comprise multiple processors (e.g., including a general-purpose/application processor, a DSP, a modem processor, a video processor, and/or a sensor processor as shown in FIG. 2). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to perform various functions described herein. Alternatively, the software 412 may not be directly executable by the processor 410 but may be configured to cause the processor 410, e.g., when compiled and executed, to perform the functions. The description may refer to the processor 410 performing a function, but this includes other implementations such as where the processor 410 executes software and/or firmware. The description may refer to the processor 410 performing a function as shorthand for one or more of the processors contained in the processor 410 performing the function. The description may refer to the server 400 performing a function as shorthand for one or more appropriate components of the server 400 performing the function. The processor 410 may include a memory with stored instructions in addition to and/or instead of the memory 411. Functionality of the processor 410 is discussed more fully below.

The transceiver 415 may include a wireless transceiver 440 and/or a wired transceiver 450 configured to communicate with other devices through wireless connections and wired connections, respectively. For example, the wireless transceiver 440 may include a wireless transmitter 442 and a wireless receiver 444 coupled to one or more antennas 446 for transmitting (e.g., on one or more downlink channels) and/or receiving (e.g., on one or more uplink channels) wireless signals 448 and transducing signals from the wireless signals 448 to wired (e.g., electrical and/or optical) signals and from wired (e.g., electrical and/or optical) signals to the wireless signals 448. Thus, the wireless transmitter 442 may include multiple transmitters that may be discrete components or combined/integrated components, and/or the wireless receiver 444 may include multiple receivers that may be discrete components or combined/integrated components. The wireless transceiver 440 may be configured to communicate signals (e.g., with the UE 200, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 3GPP LTE-V2X (PC5), IEEE 802.11 (including IEEE 802.11p), WiFi, WiFi Direct (WiFi-D), Bluetooth®, Zigbee etc. The wired transceiver 450 may include a wired transmitter 452 and a wired receiver 454 configured for wired communication, e.g., a network interface that may be utilized to communicate with the network 135 to send communications to, and receive communications from, the TRP 300, for example, and/or one or more other network entities. The wired transmitter 452 may include multiple transmitters that may be discrete components or combined/integrated components, and/or the wired receiver 454 may include multiple receivers that may be discrete components or combined/integrated components. The wired transceiver 450 may be configured, e.g., for optical communication and/or electrical communication.

The description herein may refer to the processor 410 performing a function, but this includes other implementations such as where the processor 410 executes software (stored in the memory 411) and/or firmware. The description herein may refer to the server 400 performing a function as shorthand for one or more appropriate components (e.g., the processor 410 and the memory 411) of the server 400 performing the function.

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Positioning Techniques

For terrestrial positioning of a UE in cellular networks, techniques such as Advanced Forward Link Trilateration (AFLT) and Observed Time Difference Of Arrival (OT-DOA) often operate in "UE-assisted" mode in which measurements of reference signals (e.g., PRS, CRS, etc.) transmitted by base stations are taken by the UE and then provided to a location server. The location server then calculates the position of the UE based on the measurements and known locations of the base stations. Because these techniques use the location server to calculate the position of the UE, rather than the UE itself, these positioning techniques are not frequently used in applications such as car or cell-phone navigation, which instead typically rely on satellite-based positioning.

A UE may use a Satellite Positioning System (SPS) (a Global Navigation Satellite System (GNSS)) for high-accuracy positioning using precise point positioning (PPP) or real time kinematic (RTK) technology. These technologies use assistance data such as measurements from ground-based stations. LTE Release 15 allows the data to be encrypted so that the UEs subscribed to the service exclusively can read the information. Such assistance data varies with time. Thus, a UE subscribed to the service may not easily "break encryption" for other UEs by passing on the data to other UEs that have not paid for the subscription. The passing on would need to be repeated every time the assistance data changes.

In UE-assisted positioning, the UE sends measurements (e.g., TDOA, Angle of Arrival (AoA), etc.) to the positioning server (e.g., LMF/eSMLC). The positioning server has the base station almanac (BSA) that contains multiple 'entries' or 'records', one record per cell, where each record contains geographical cell location but also may include other data. An identifier of the 'record' among the multiple 'records' in the BSA may be referenced. The BSA and the measurements from the UE may be used to compute the position of the UE.

In conventional UE-based positioning, a UE computes its own position, thus avoiding sending measurements to the network (e.g., location server), which in turn improves latency and scalability. The UE uses relevant BSA record information (e.g., locations of gNBs (more broadly base stations)) from the network. The BSA information may be encrypted. But since the BSA information varies much less often than, for example, the PPP or RTK assistance data described earlier, it may be easier to make the BSA information (compared to the PPP or RTK information) available to UEs that did not subscribe and pay for decryption keys. Transmissions of reference signals by the gNBs make BSA information potentially accessible to crowd-sourcing or war-driving, essentially enabling BSA information to be generated based on in-the-field and/or over-the-top observations.

Positioning techniques may be characterized and/or assessed based on one or more criteria such as position determination accuracy and/or latency. Latency is a time elapsed between an event that triggers determination of position-related data and the availability of that data at a positioning system interface, e.g., an interface of the LMF 120. At initialization of a positioning system, the latency for the availability of position-related data is called time to first fix (TTFF), and is larger than latencies after the TTFF. An inverse of a time elapsed between two consecutive position-related data availabilities is called an update rate, i.e., the rate at which position-related data are generated after the first fix. Latency may depend on processing capability, e.g., of the UE. For example, a UE may report a processing capability of the UE as a duration of DL PRS symbols in units of time (e.g., milliseconds) that the UE can process every T amount of time (e.g., T ms) assuming 272 PRB (Physical Resource Block) allocation. Other examples of capabilities that may affect latency are a number of TRPs from which the UE can process PRS, a number of PRS that the UE can process, and a bandwidth of the UE.

One or more of many different positioning techniques (also called positioning methods) may be used to determine position of an entity such as one of the UEs 105, 106. For example, known position-determination techniques include RTT, multi-RTT, OTDOA (also called TDOA and including UL-TDOA and DL-TDOA), Enhanced Cell Identification (E-CID), DL-AoD, UL-AoA, etc. RTT uses a time for a signal to travel from one entity to another and back to determine a range between the two entities. The range, plus a known location of a first one of the entities and an angle between the two entities (e.g., an azimuth angle) can be used to determine a location of the second of the entities. In multi-RTT (also called multi-cell RTT), multiple ranges from one entity (e.g., a UE) to other entities (e.g., TRPs) and known locations of the other entities may be used to determine the location of the one entity. In TDOA techniques, the difference in travel times between one entity and other entities may be used to determine relative ranges from the other entities and those, combined with known locations of the other entities may be used to determine the location of the one entity. Angles of arrival and/or departure may be used to help determine location of an entity. For example, an angle of arrival or an angle of departure of a signal combined with a range between devices (determined using signal, e.g., a travel time of the signal, a received power of the signal, etc.) and a known location of one of the devices may be used to determine a location of the other device. The angle of arrival or departure may be an azimuth angle relative to a reference direction such as true north. The angle of arrival or departure may be a zenith angle relative to directly upward from an entity (i.e., relative to radially outward from a center of Earth). E-CID uses the identity of a serving cell, the timing advance (i.e., the difference between receive and transmit times at the UE), estimated timing and power of detected neighbor cell signals, and possibly angle of arrival (e.g., of a signal at the UE from the base station or vice versa) to determine location of the UE. In TDOA, the difference in arrival times at a receiving device of signals from different sources along with known locations of the sources and known offset of transmission times from the sources are used to determine the location of the receiving device.

In a network-centric RTT estimation, the serving base station instructs the UE to scan for/receive RTT measurement signals (e.g., PRS) on serving cells of two or more neighboring base stations (and typically the serving base station, as at least three base stations are needed). The one of more base stations transmit RTT measurement signals on low reuse resources (e.g., resources used by the base station to transmit system information) allocated by the network (e.g., a location server such as the LMF 120). The UE records the arrival time (also referred to as a receive time, a reception time, a time of reception, or a time of arrival (ToA)) of each RTT measurement signal relative to the UE's current downlink timing (e.g., as derived by the UE from a DL signal received from its serving base station), and transmits a common or individual RTT response message (e.g., SRS (sounding reference signal) for positioning, i.e., UL-PRS) to the one or more base stations (e.g., when instructed by its serving base station) and may include the time difference $T_{Rx \to Tx}$ (i.e., UE $T_{Rx-Tx}$ or $UE_{Rx-Tx}$) between the ToA of the RTT measurement signal and the transmission time of the RTT response message in a payload of each RTT response message. The RTT response message would include a reference signal from which the base station can deduce the ToA of the RTT response. By comparing the difference $T_{Tx \to Rx}$ between the transmission time of the RTT measurement signal from the base station and the ToA of the RTT response at the base station to the UE-reported time difference $T_{Rx \to Tx}$, the base station can deduce the propagation time between the base station and the UE, from which the base station can determine the distance between the UE and the base station by assuming the speed of light during this propagation time.

A UE-centric RTT estimation is similar to the network-based method, except that the UE transmits uplink RTT measurement signal(s) (e.g., when instructed by a serving base station), which are received by multiple base stations in the neighborhood of the UE. Each involved base station responds with a downlink RTT response message, which may include the time difference between the ToA of the RTT measurement signal at the base station and the transmission time of the RTT response message from the base station in the RTT response message payload.

For both network-centric and UE-centric procedures, the side (network or UE) that performs the RTT calculation typically (though not always) transmits the first message(s) or signal(s) (e.g., RTT measurement signal(s)), while the other side responds with one or more RTT response message (s) or signal(s) that may include the difference between the ToA of the first message(s) or signal(s) and the transmission time of the RTT response message(s) or signal(s).

A multi-RTT technique may be used to determine position. For example, a first entity (e.g., a UE) may send out one or more signals (e.g., unicast, multicast, or broadcast from the base station) and multiple second entities (e.g., other TSPs such as base station(s) and/or UE(s)) may receive a signal from the first entity and respond to this received signal. The first entity receives the responses from the multiple second entities. The first entity (or another entity such as an LMF) may use the responses from the second entities to determine ranges to the second entities and may use the multiple ranges and known locations of the second entities to determine the location of the first entity by trilateration.

In some instances, additional information may be obtained in the form of an angle of arrival (AoA) or angle of departure (AoD) that defines a straight-line direction (e.g., which may be in a horizontal plane or in three dimensions) or possibly a range of directions (e.g., for the UE from the locations of base stations). The intersection of two directions can provide another estimate of the location for the UE.

For positioning techniques using PRS (Positioning Reference Signal) signals (e.g., TDOA and RTT), PRS signals sent by multiple TRPs are measured and the arrival times of the signals, known transmission times, and known locations of the TRPs used to determine ranges from a UE to the TRPs. For example, an RSTD (Reference Signal Time Difference) may be determined for PRS signals received from multiple TRPs and used in a TDOA technique to determine position (location) of the UE. A positioning reference signal may be referred to as a PRS or a PRS signal. The PRS signals are typically sent using the same power and PRS signals with the same signal characteristics (e.g., same frequency shift) may interfere with each other such that a PRS signal from a more distant TRP may be overwhelmed by a PRS signal from a closer TRP such that the signal from the more distant TRP may not be detected. PRS muting may be used to help reduce interference by muting some PRS signals (reducing the power of the PRS signal, e.g., to zero and thus not transmitting the PRS signal). In this way, a weaker (at the UE) PRS signal may be more easily detected by the UE without a stronger PRS signal interfering with the weaker PRS signal. The term RS, and variations thereof (e.g., PRS, SRS), may refer to one reference signal or more than one reference signal.

Positioning reference signals (PRS) include downlink PRS (DL PRS, often referred to simply as PRS) and uplink PRS (UL PRS) (which may be called SRS (Sounding Reference Signal) for positioning). A PRS may comprise a PN code (pseudorandom number code) or be generated using a PN code (e.g., scrambling a PN code with another signal) such that a source of the PRS may serve as a pseudo-satellite (a pseudolite). The PN code may be unique to the PRS source (at least within a specified area such that identical PRS from different PRS sources do not overlap). PRS may comprise PRS resources or PRS resource sets of a frequency layer. A DL PRS positioning frequency layer (or simply a frequency layer) is a collection of DL PRS resource sets, from one or more TRPs, with PRS resource(s) that have common parameters configured by higher-layer parameters DL-PRS-PositioningFrequencyLayer, DL-PRS-Resource-Set, and DL-PRS-Resource. Each frequency layer has a DL PRS subcarrier spacing (SCS) for the DL PRS resource sets and the DL PRS resources in the frequency layer. Each frequency layer has a DL PRS cyclic prefix (CP) for the DL PRS resource sets and the DL PRS resources in the frequency layer. In 5G, a resource block occupies 12 consecutive subcarriers and a specified number of symbols. Also, a DL PRS Point A parameter defines a frequency of a reference resource block (and the lowest subcarrier of the resource block), with DL PRS resources belonging to the same DL PRS resource set having the same Point A and all DL PRS resource sets belonging to the same frequency layer having the same Point A. A frequency layer also has the same DL PRS bandwidth, the same start PRB (and center frequency), and the same value of comb size (i.e., a frequency of PRS resource elements per symbol such that for comb-N, every $N^{th}$ resource element is a PRS resource element). A PRS resource set is identified by a PRS resource set ID and may be associated with a particular TRP (identified by a cell ID) transmitted by an antenna panel of a base station. A PRS resource ID in a PRS resource set may be associated with an omnidirectional signal, and/or with a single beam (and/or beam ID) transmitted from a single base station (where a base station may transmit one or more beams). Each PRS resource of a PRS resource set may be transmitted on a different beam and as such, a PRS resource, or simply resource can also be referred to as a beam. This does not have any implications on whether the base stations and the beams on which PRS are transmitted are known to the UE.

A TRP may be configured, e.g., by instructions received from a server and/or by software in the TRP, to send DL PRS per a schedule. According to the schedule, the TRP may send the DL PRS intermittently, e.g., periodically at a consistent interval from an initial transmission. The TRP may be configured to send one or more PRS resource sets. A resource set is a collection of PRS resources across one TRP, with the resources having the same periodicity, a common muting pattern configuration (if any), and the same repetition factor across slots. Each of the PRS resource sets comprises multiple PRS resources, with each PRS resource comprising multiple Resource Elements (REs) that may be in multiple Resource Blocks (RBs) within N (one or more) consecutive symbol(s) within a slot. An RB is a collection of REs spanning a quantity of one or more consecutive symbols in the time domain and a quantity (12 for a 5G RB) of consecutive sub-carriers in the frequency domain. Each PRS resource is configured with an RE offset, slot offset, a symbol offset within a slot, and a number of consecutive symbols that the PRS resource may occupy within a slot. The RE offset defines the starting RE offset of the first symbol within a DL PRS resource in frequency. The relative RE offsets of the remaining symbols within a DL PRS resource are defined based on the initial offset. The slot offset is the starting slot of the DL PRS resource with respect to a corresponding resource set slot offset. The symbol offset determines the starting symbol of the DL PRS resource within the starting slot. Transmitted REs may repeat across slots, with each transmission being called a repetition such that there may be multiple repetitions in a PRS resource. The DL PRS resources in a DL PRS resource set are associated with the same TRP and each DL PRS resource has a DL PRS resource ID. A DL PRS resource ID in a DL PRS resource set is associated with a single beam transmitted from a single TRP (although a TRP may transmit one or more beams).

A PRS resource may also be defined by quasi-co-location and start PRB parameters. A quasi-co-location (QCL) parameter may define any quasi-co-location information of the DL PRS resource with other reference signals. The DL PRS may be configured to be QCL type D with a DL PRS or SS/PBCH (Synchronization Signal/Physical Broadcast Channel) Block from a serving cell or a non-serving cell. The DL PRS may be configured to be QCL type C with an SS/PBCH Block from a serving cell or a non-serving cell. The start PRB parameter defines the starting PRB index of the DL PRS resource with respect to reference Point A. The starting PRB index has a granularity of one PRB and may have a minimum value of 0 and a maximum value of 2176 PRBs.

A PRS resource set is a collection of PRS resources with the same periodicity, same muting pattern configuration (if any), and the same repetition factor across slots. Every time all repetitions of all PRS resources of the PRS resource set are configured to be transmitted is referred as an "instance". Therefore, an "instance" of a PRS resource set is a specified number of repetitions for each PRS resource and a specified number of PRS resources within the PRS resource set such that once the specified number of repetitions are transmitted for each of the specified number of PRS resources, the instance is complete. An instance may also be referred to as an "occasion." A DL PRS configuration including a DL PRS transmission schedule may be provided to a UE to facilitate (or even enable) the UE to measure the DL PRS.

Multiple frequency layers of PRS may be aggregated to provide an effective bandwidth that is larger than any of the bandwidths of the layers individually. Multiple frequency layers of component carriers (which may be consecutive and/or separate) and meeting criteria such as being quasi co-located (QCLed), and having the same antenna port, may be stitched to provide a larger effective PRS bandwidth (for DL PRS and UL PRS) resulting in increased time of arrival measurement accuracy. Stitching comprises combining PRS measurements over individual bandwidth fragments such that the stitched PRS may be treated as having been taken from a single measurement. Being QCLed, the different frequency layers behave similarly, enabling stitching of the PRS to yield the larger effective bandwidth. The larger effective bandwidth, which may be referred to as the bandwidth of an aggregated PRS or the frequency bandwidth of an aggregated PRS, provides for better time-domain resolution (e.g., of TDOA). An aggregated PRS includes a collection of PRS resources and each PRS resource of an aggregated PRS may be called a PRS component, and each PRS component may be transmitted on different component carriers, bands, or frequency layers, or on different portions of the same band.

RTT positioning is an active positioning technique in that RTT uses positioning signals sent by TRPs to UEs and by UEs (that are participating in RTT positioning) to TRPs. The TRPs may send DL-PRS signals that are received by the UEs and the UEs may send SRS (Sounding Reference Signal) signals that are received by multiple TRPs. A sounding reference signal may be referred to as an SRS or an SRS signal. In 5G multi-RTT, coordinated positioning may be used with the UE sending a single UL-SRS for positioning that is received by multiple TRPs instead of sending a separate UL-SRS for positioning for each TRP. A TRP that participates in multi-RTT will typically search for UEs that are currently camped on that TRP (served UEs, with the TRP being a serving TRP) and also UEs that are camped on neighboring TRPs (neighbor UEs). Neighbor TRPs may be TRPs of a single BTS (e.g., gNB), or may be a TRP of one BTS and a TRP of a separate BTS. For RTT positioning, including multi-RTT positioning, the DL-PRS signal and the UL-SRS for positioning signal in a PRS/SRS for positioning signal pair used to determine RTT (and thus used to determine range between the UE and the TRP) may occur close in time to each other such that errors due to UE motion and/or UE clock drift and/or TRP clock drift are within acceptable limits. For example, signals in a PRS/SRS for positioning signal pair may be transmitted from the TRP and the UE, respectively, within about 10 ms of each other. With SRS for positioning signals being sent by UEs, and with PRS and SRS for positioning signals being conveyed close in time to each other, it has been found that radio-frequency (RF) signal congestion may result (which may cause excessive noise, etc.) especially if many UEs attempt positioning concurrently and/or that computational congestion may result at the TRPs that are trying to measure many UEs concurrently.

RTT positioning may be UE-based or UE-assisted. In UE-based RTT, the UE 200 determines the RTT and corresponding range to each of the TRPs 300 and the position of the UE 200 based on the ranges to the TRPs 300 and known locations of the TRPs 300. In UE-assisted RTT, the UE 200 measures positioning signals and provides measurement information to the TRP 300, and the TRP 300 determines the RTT and range. The TRP 300 provides ranges to a location server, e.g., the server 400, and the server determines the location of the UE 200, e.g., based on ranges to different TRPs 300. The RTT and/or range may be determined by the TRP 300 that received the signal(s) from the UE 200, by this TRP 300 in combination with one or more other devices, e.g., one or more other TRPs 300 and/or the server 400, or by one or more devices other than the TRP 300 that received the signal(s) from the UE 200.

Various positioning techniques are supported in 5G NR. The NR native positioning methods supported in 5G NR include DL-only positioning methods, UL-only positioning methods, and DL+UL positioning methods. Downlink-based positioning methods include DL-TDOA and DL-AoD. Uplink-based positioning methods include UL-TDOA and UL-AoA. Combined DL+UL-based positioning methods include RTT with one base station and RTT with multiple base stations (multi-RTT).

A position estimate (e.g., for a UE) may be referred to by other names, such as a location estimate, location, position, position fix, fix, or the like. A position estimate may be geodetic and comprise coordinates (e.g., latitude, longitude, and possibly altitude) or may be civic and comprise a street address, postal address, or some other verbal description of a location. A position estimate may further be defined relative to some other known location or defined in absolute terms (e.g., using latitude, longitude, and possibly altitude). A position estimate may include an expected error or uncertainty (e.g., by including an area or volume within which the location is expected to be included with some specified or default level of confidence).

The configuration of the server 400 shown in FIG. 4 is an example and not limiting of the disclosure, including the claims, and other configurations may be used. For example, the wireless transceiver 440 may be omitted. Also or alternatively, the description herein discusses that the server 400 is configured to perform or performs several functions, but one or more of these functions may be performed by the TRP 300 and/or the UE 200 (i.e., the TRP 300 and/or the UE 200 may be configured to perform one or more of these functions).

Combined Processing of Frequency-Hopped PRS

PRS may be transmitted by TRPs as frequency-hopped PRS, with different portions of the PRS having different component carriers, and the frequency-hopped PRS portions processed in combination to determine position information, e.g., one or more measurements such as ToA, position of a UE, etc. The determined position information may be of greater accuracy than position information determined from PRS that are not frequency hopped and that span a smaller bandwidth than the combined, frequency-hopped PRS. Portions of one or more PRS may be processed in combination, where for multiple PRS, the PRS are associated with each other in a way that the UE is allowed and/or expected to process the portions jointly, e.g., with the UE being able to assume that the PRS are from the same port or are QCLed.

Figure 5:
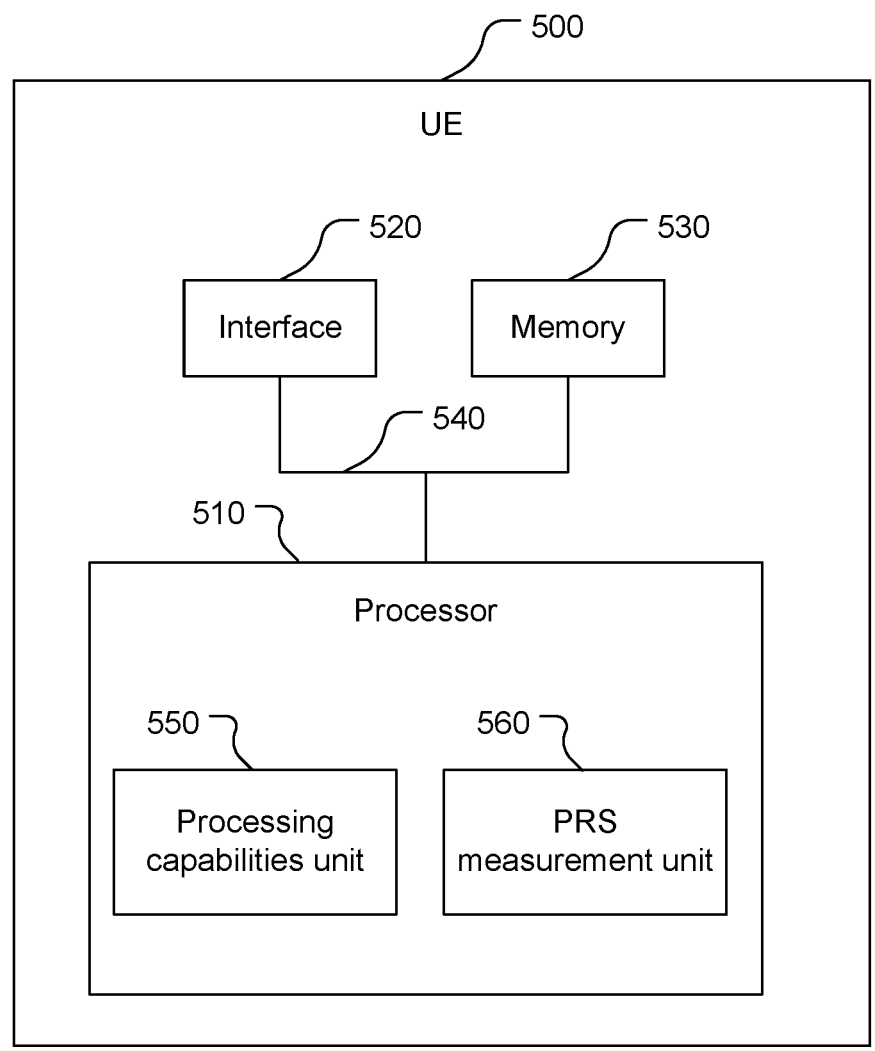
FIG. 5 is a block diagram of an example user equipment.

Referring to FIG. 5, with further reference to FIGS. 1-4, a UE 500 includes a processor 510, an interface 520, and a memory 530 communicatively coupled to each other by a bus 540. The UE 500 may include the components shown in FIG. 5, and may include one or more other components such as any of those shown in FIG. 2 such that the UE 200 may be an example of the UE 500. The interface 520 may include one or more of the components of the transceiver 215, e.g., the wireless transmitter 242 and the antenna 246, or the wireless receiver 244 and the antenna 246, or the wireless transmitter 242, the wireless receiver 244, and the antenna 246. Also or alternatively, the interface 520 may include the wired transmitter 252 and/or the wired receiver 254. The memory 530 may be configured similarly to the memory 211, e.g., including software with processor-readable instructions configured to cause the processor 510 to perform functions. The description herein may refer only to the processor 510 performing a function, but this includes other implementations such as where the processor 510 executes software (stored in the memory 530) and/or firmware. The description herein may refer to the UE 500 performing a function as shorthand for one or more appropriate components (e.g., the processor 510 and the memory 530) of the UE 500 performing the function. The processor 510 (possibly in conjunction with the memory 530 and, as appropriate, the interface 520) includes a processing capabilities unit 550 and a PRS measurement unit 560. The processing capabilities unit 550 is configured to report one or more processing capabilities of the UE 500 regarding processing frequency-hopped PRS portions in combination (e.g., coherently combining frequency-hopped PRS portions, which may be called stitching), and to process frequency-hopped PRS portions in combination. The PRS measurement unit 560 is configured to determine position information from received PRS. The processing capabilities unit 550 and the PRS measurement unit are discussed further below, and the description may refer to the processor 510 generally, or the UE 500 generally, as performing any of the functions of the processing capabilities unit 550 and/or the PRS measurement unit 560.

Referring again to FIG. 4, with further reference to FIG. 5, the processor 410 (possibly in conjunction with the memory 411 and, as appropriate, (one or more portions of) the transceiver 415) includes a PRS scheduling unit 460 and a positioning timeline unit 470. The PRS scheduling unit 460 is configured to coordinate with TRPs as to how/when the TRPs will transmit DL PRS, e.g., transmit DL PRS with frequency-hopped PRS components. The positioning timeline unit 470 is configured to determine positioning timeline information such as an update rate of position information (e.g., one or more position measurements of one or more positioning signals received by the UE 500, or location of the UE 500). The positioning timeline unit 470 may be configured to determine an accuracy of position information, e.g., an actual accuracy of a determined position of the UE 500 or an expected accuracy of position information such as one or more PRS measurements and/or a position of the UE 500. The positioning timeline unit 470 may be configured to determine the positioning timeline information based on a processing capability of the UE 500 for processing frequency-hopped PRS components in combination. The PRS scheduling unit 460 and the positioning timeline unit 470 are discussed further below, and the description may refer to the processor 410 generally, or the server 400 generally, as performing any of the functions of the PRS scheduling unit 460 and/or the positioning timeline unit 470.

Figure 6:
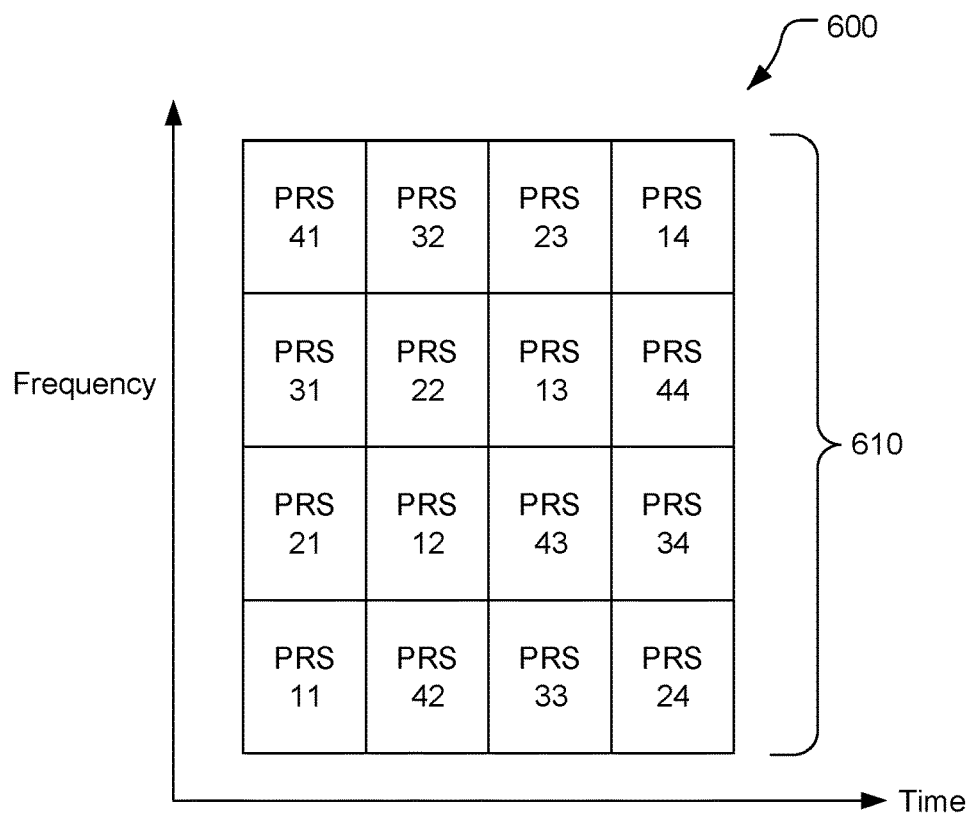
FIG. 6 is a timing and frequency diagram of multiple frequency-hopped positioning reference signals.

Referring also to FIG. 6, the server 400, e.g., the PRS scheduling unit 460, may cause TRPs to send PRS with frequency-hopped PRS portions (also called PRS components). The TRPs may be caused to transmit frequency-hopped PRS portions with a variety of characteristics, e.g., component carriers, bandwidths, start RBs, frequency separations, time separations, symbol durations, etc. In the example shown in FIG. 6, a collection 600 includes four PRS transmitted by respective TRPs, with a TRP1 transmitting PRS portions PRS 11, PRS 12, PRS 13, PRS 14, a TRP2 transmitting PRS portions PRS 21, PRS 22, PRS 23, PRS 24, a TRP3 transmitting PRS portions PRS 31, PRS 32, PRS 33, PRS 34, and a TRP4 transmitting PRS portions PRS 41, PRS 42, PRS 43, PRS 44. The PRS portions from each TRP may correspond to one PRS or multiple PRS. Each of the PRS have frequency-hopped portions, in this example, four frequency-hopped portions with consecutive (in time) PRS portions having no separation in time or frequency. The four PRS portions of each of the four PRS (each comprising one or more PRS) span a same total bandwidth 610 and this total bandwidth is a bandwidth of a frequency layer of the frequency-hopped PRS. Thus, if the four PRS portions shown for the frequency-hopped PRS are combined for processing, then the four frequency-hopped PRS will have the same bandwidth and center frequency. No specific time length is specified for the PRS portions, and each the PRS portions may be of a variety of time lengths, e.g., one symbol, two symbols, four symbols, eight symbols, 12 symbols, or other length. Each of the PRS portions may occupy one or more resource elements in a symbol. Each group of the PRS portions are associated in such a way that the UE 500 may assume that the UE 500 is allowed to and/or expected to process the PRS portions jointly, e.g., with the PRS portions corresponding to the same port or being QCLed. Transmitting the PRS in multiple portions enables higher transmit power per bandwidth portion than if the entire bandwidth was transmitted at once.

Figure 7:
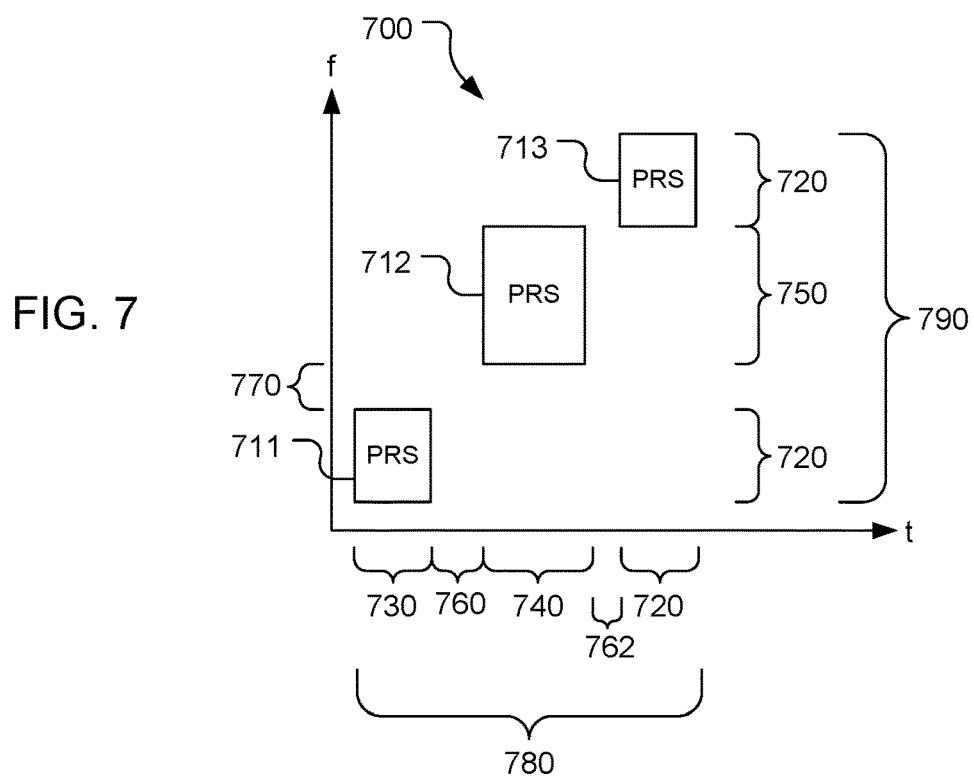
FIG. 7 is a timing and frequency diagram of frequency-hopped positioning reference signal portions that may be processed in combination.

Referring also to FIG. 7, PRS portions may be of similar length in time and of similar bandwidth as in the example collection 600 shown in FIG. 6, or may be of different time durations and/or different bandwidths as shown in FIG. 7. For example, a PRS 700 includes three PRS portions 711, 712, 713. The PRS portions 711, 713 span a same bandwidth 720 and a same time 730, while the PRS portion 712 spans a different, longer time 740 than the PRS portions 711, 713 and spans a different, larger bandwidth 750 than the PRS portions 711, 713. Further, the PRS portion 712 is separated by a time 760 from the PRS portion 711, is separated by a time 762 from the PRS portion 713, and is separated by a frequency 770 from the PRS portion 711. The PRS 700 spans a total time 780 and a total bandwidth 790.

Figure 8A:
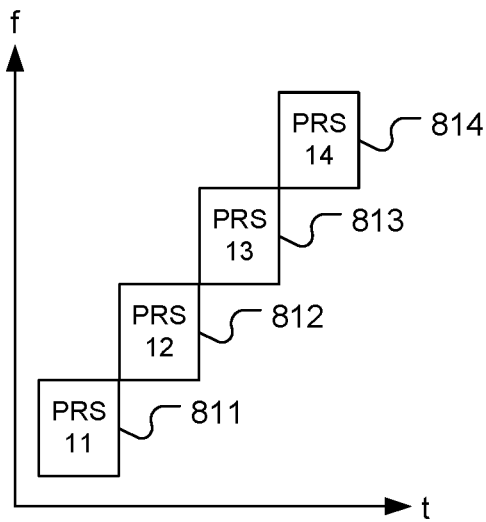
FIG. 8A is a timing and frequency diagram of frequency-hopped positioning reference signal portions processed separately.
Figure 8B:
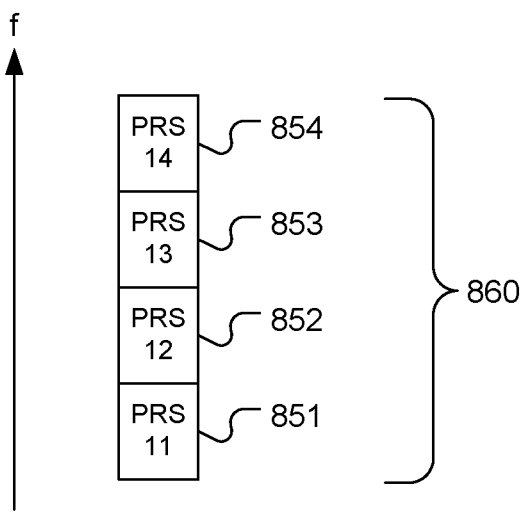
FIG. 8B is a frequency-domain diagram of a processing combination of the frequency-hopped positioning reference signal portions shown in FIG. 8A.

The PRS measurement unit 560 may or may not be configured to process multi-frequency PRS portions in combination. For example, referring also to FIG. 8A, the PRS measurement unit 560 may not be configured to process PRS portions 811, 812, 813, 814 in combination, but be configured to process the PRS portions 811, 812, 813, 814 separately to determine and report separate position information (e.g., ToA) for each of the PRS portions 811-814. The PRS measurement unit 560 may report less than all of the position information, e.g., may report a single ToA, e.g., the ToA determined to be the best (e.g., most accurate). In this case, a PRS processing bandwidth is the same as a PRS transmitting bandwidth. Alternatively, the PRS measurement unit 560 may be configured to process multi-frequency PRS portions in combination, e.g., to coherently combine the PRS portions by processing samples of the PRS portions with the same FFT (Fast Fourier Transform), to determine position information (e.g., a measurement or a position of the UE 500). Combining PRS portions will increase the PRS processing bandwidth, to a sum of the combined PRS portions, and may increase performance, e.g., ToA accuracy (e.g., due to finer resolution, i.e., more frequent, sampling in the time domain). The PRS measurement unit 560 may, for example, populate an FFT buffer with samples from different frequency-hopped PRS portions of different frequencies (e.g., different component carriers) as if the PRS portions were transmitted in the same symbol. Thus, for example, referring also to FIG. 8B, the PRS measurement unit 560 may be able to coherently combine frequency-hopped PRS portions 851, 852, 853, 854 such that the PRS portions 851-854 yield combined position information, e.g., a single ToA for the combination of the PRS portions 851-854, and span a composite bandwidth 860.

Figure 9:
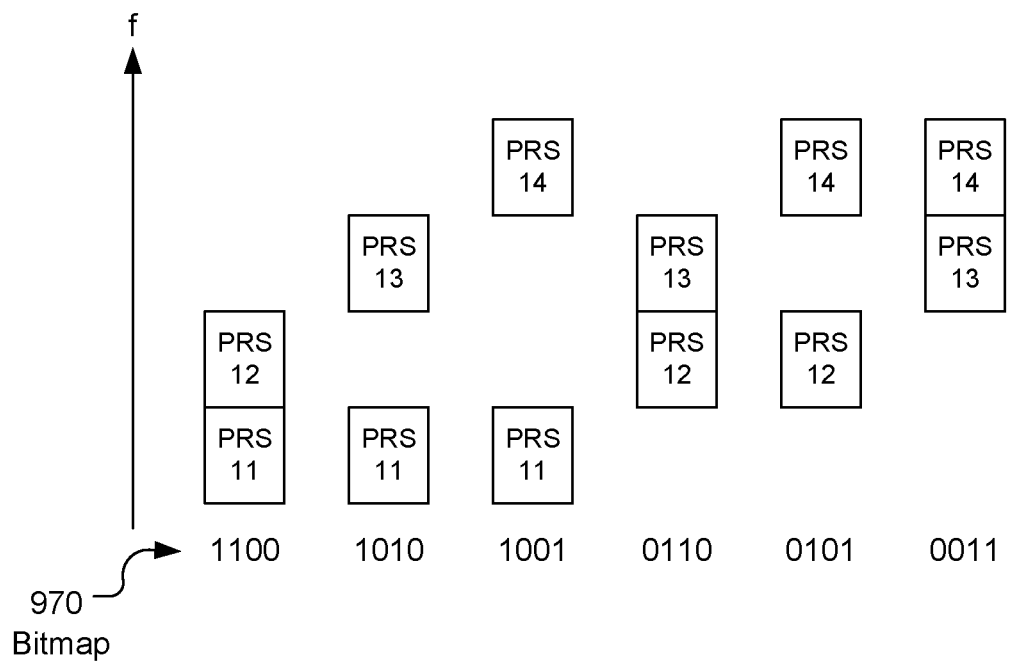
FIG. 9 is a frequency-domain diagram of processing combinations of two frequency-hopped positioning reference signal portions each.
Figure 10:
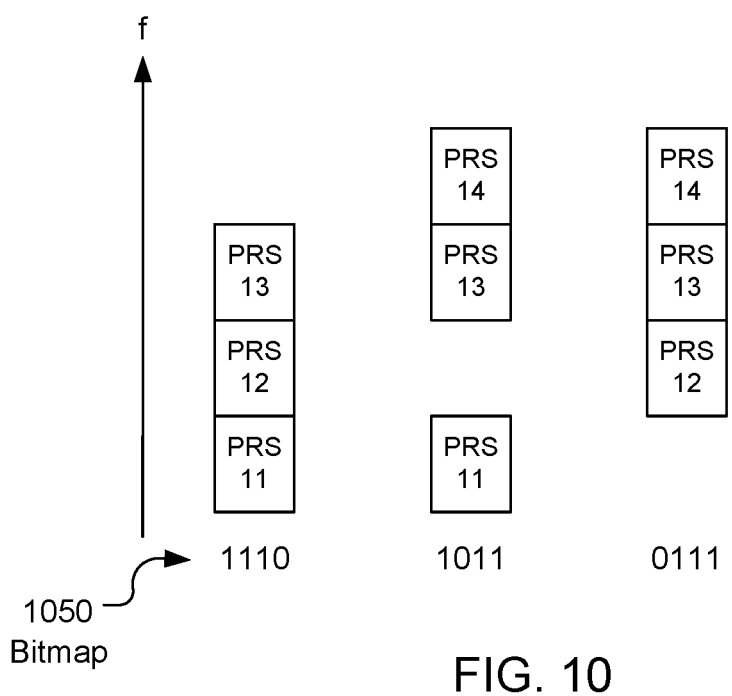
FIG. 10 is a frequency-domain diagram of processing combinations of three frequency-hopped positioning reference signal portions each.

Referring also to FIGS. 9 and 10, the PRS measurement unit 560 may be configured (e.g., may be able) to process various combinations of frequency-hopped PRS portions. The PRS measurement unit 560 may be configured to process, in combination, fewer than all frequency-hopped PRS portions that a TRP may transmit. For example, as shown in FIGS. 9 and 10, the PRS measurement unit 560 may be configured to combine combinations of two frequency-hopped PRS portions and/or to combine combinations of three frequency-hopped PRS portions of four frequency-hopped PRS portions that are transmittable by the TRP 300. These are but examples, and the TRP 300 may send frequency-hopped PRS with more or fewer than four PRS portions and the PRS measurement unit 560 may be configured to process more than three PRS portions of different frequency bands (sub-bands) in combination.

The processing capabilities unit 550 is configured to report the capability of the UE 500 to process frequency-hopped PRS in combination, i.e., to stitch multi-frequency PRS portions. The processing capabilities unit 550 may be configured to report to a network entity, such as the server 400, that the UE 500 is unable to stitch frequency-hopped PRS portions or that the UE 500 may process frequency-hopped PRS portions in combination, depending on the capability of the UE 500. The processing capabilities unit 500 may be configured to report criteria affecting the ability of the UE 500 to stitch frequency-hopped PRS portions. The criteria may include one or more criteria for the PRS portions to satisfy in order for the UE 500 to be able to process the PRS portions in combination, e.g., in order for the PRS portions to maintain RF coherency. The criteria may include, for example: PRS portions being QCLed; PRS portions being from the same antenna port; a maximum quantity of PRS components of different frequencies; a maximum frequency separation (e.g., maximum number of sub-bands) between PRS portions (e.g., that are received consecutively in time), i.e., a maximum frequency hop (e.g., a maximum value of the frequency 770); a maximum time separation between consecutive PRS portions (e.g., a maximum value of the time 760 or the time 762); a maximum total frequency span of the PRS portions (e.g., the frequency 790); a maximum time span of the PRS portions (e.g., the time 780); one or more particular combinations of possible PRS portions; etc.

As shown in FIGS. 9 and 10, the processing capabilities unit 550 may be configured to report one or more specific combinations of PRS portions that the UE 500 can process in combination. The processing capabilities unit 550 may, for example, report a bitmap containing a quantity of bits corresponding to a quantity of PRS portions of different sub-bands that the TRP 300 can transmit, with each bit in the bitmap indicating whether the PRS measurement unit 560 can process that PRS portion. If the PRS portions are repetitions, then the quantity of bits in the bitmap may equal a repetition factor of the PRS. The processing capabilities unit 550 may, for example, be configured to report one or more bitmaps 970 indicating combinations of two PRS portions that the UE 500 can process in combination, and/or to report one or more bitmaps 1050 indicating combinations of three PRS portions that the UE 500 can process in combination. For example, the value of 1010 of the bitmap 970 indicates that the UE 500 can process PRS 11 and PRS 13 in combination (e.g., coherently combine PRS 11 and PRS 13), and the value of 1011 of the bitmap 1050 indicates that the UE 500 can process PRS 11, PRS 13, and PRS 14 in combination. Different UEs may be able to process different combinations of frequency-hopped PRS portions. For example, some UEs may only be able to process combinations of frequency-hopped PRS portions that are in consecutive sub-bands.

The processing capabilities unit 550 may be configured provide an indication of what quality of processing can be provided with corresponding combined PRS portion processing. For example, the processing capabilities unit 550 may report what error rate and/or accuracy may be achieved for a future positioning signal measurement based on a corresponding combination of PRS portions, or what error rate and/or accuracy a determined positioning measurement has. Different accuracies may be provided for different bandwidths of the combined PRS portions (e.g., 50% absolute ToA error of 2.5 ns with a 100 MHz bandwith, 1.2 ns with a 200 MHz bandwidth, and 0.7 ns with a 400 MHz bandwidth). The accuracy that may be achieved by the PRS measurement unit 560 may depend on a total frequency of combined PRS portions and/or may depend the frequency span of the combined PRS portions and not simply the total bandwidth of the individual PRS portions. For example, for the combination of PRS 11 and PRS 14, the accuracy may correspond to the bandwidth 860 as opposed to a sum of bandwidths of PRS 11 and PRS 14, and thus the accuracy of a measurement of the combination of PRS 11 and PRS 14 may be similar to (e.g., may equal) the accuracy of a measurement of the combination of PRS 11, PRS 12, PRS 13, and PRS 14.

The accuracy providable by the UE 500 if the UE 500 processes the frequency-hopped PRS portions separately depends on the individual bandwidths of the PRS portions and not a combination of bandwidths. The accuracy of ToA measurements is inversely proportional to the bandwidth of the sub-band being measured. Thus, the accuracy of the ToA measurements from processing the PRS portions separately will be at least as good as for the PRS portion with the smallest bandwidth. The ToA measurement with the highest accuracy (highest resolution, lowest expected error) will be from measuring the PRS portion with the largest bandwidth.

The processing capabilities unit 550 may be configured provide an indication of a processing time of the UE 500 to process a combination of PRS portions. For example, the processing capabilities unit 550 may be configured provide a processing time indication for each bitmap combination of PRS portions, or for each quantity of PRS portions, or for a combined bandwidth of PRS portions, or for one or more other characteristics of PRS portions to be processed in combination.

Figure 11:
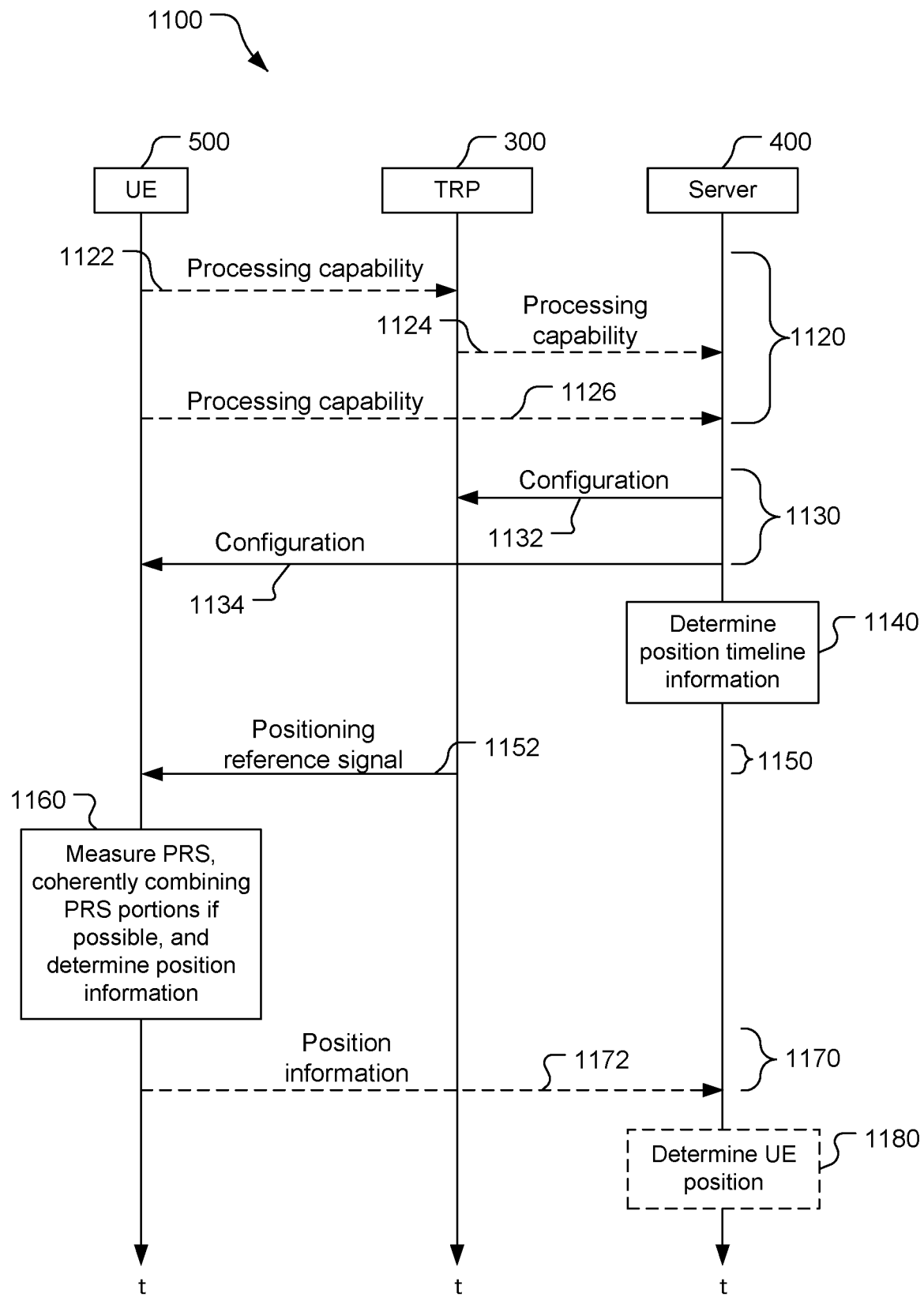
FIG. 11 is a timing diagram of signal and processing flow for determining position information, possibly processing multiple frequency-hopped positioning reference signals in combination.

Referring to FIG. 11, with further reference to FIGS. 1-10, a signaling and process flow 1100 for determining position information from frequency-hopped PRS portions includes the stages shown. The flow 1100 is an example only, as stages may be added, rearranged, and/or removed. For example, stage 1120, stage 1170, and/or stage 1180 may be omitted, e.g., a capability of the UE 500 for processing PRS portions in combination may not be reported to the server 400 in advance of processing PRS.

At stage 1120, the UE 500 sends one or more indications of one or more processing capabilities for processing frequency-hopped PRS portions in combination. For example, the processing capabilities unit 550 may send a processing capability message 1122 to the TRP 300 that sends a corresponding processing capability message 1124 (including capability content of the message 1122) to the server 400 and/or the processing capabilities unit 550 may send a processing capability message 1126 directly to the server 400. The message(s) 1122, 1126 include(s) a processing capability of the UE 500 for processing PRS portions of multiple frequencies in combination. For example, the processing capability message 1122 and/or the processing capability message 1126 may include an indication that the UE 500 cannot process frequency-hopped PRS portions in combination, i.e., cannot or will not process PRS portions of different frequency sub-bands to determine a PRS measurement. As another example, the processing capability message 1122 and/or the processing capability message 1126 may include an indication that the UE 500 is capable of processing multiple PRS portions of different sub-bands in combination. The message 1122 and/or the message 1126 may include one or more criteria for the PRS portions in order for the UE 500 to process the PRS portions in combination. The message(s) 1122, 1126 may include one or more bitmaps indicating the PRS portions that the UE 500 may process in combination. The message(s) 1122, 1126 may include indications of position information accuracy corresponding to different criteria and/or different PRS portion combinations (e.g., different bitmaps). The UE 500 may send the message(s) 1122, 1126 intermittently (e.g., periodically at regular intervals) and/or in response to a trigger (e.g., a change in capabilities, a change in the serving TRP 300, a change in a serving server 400, etc.).

At stage 1130, the server 400 may send a configuration message 1132 with PRS configuration instructions to the TRP 300. The configuration message 1132 may be an actual instruction or may represent a result of bi-directional communication between the TRP 300 and the server 400. While FIG. 11 shows only one configuration message being sent to only one TRP, PRS instructions may be sent by the server 400 to multiple TRPs for sending PRS (e.g., to transmit the collection 600 of PRS shown in FIG. 6). The PRS scheduling unit 460 may determine which frequency-hopped PRS portions the TRP 300 should transmit based on the processing capability(ies) of the UE 500. For example, the PRS scheduling unit 460 may send PRS instructions to the TRP 300 to transmit only PRS portions that the UE 500 will be able to process in combination (e.g., coherently combine). As another example, the PRS scheduling unit 460 may send PRS instructions to the TRP 300 to transmit only PRS portions that the UE 500 will be able to process in combination to meet one or more performance criteria, e.g., at least a threshold accuracy and/or no more than a threshold latency. As another example, the PRS scheduling unit 460 may respond to the UE 500 indicating that the UE 500 will not process frequency-hopped PRS portions in combination by sending PRS instructions to the TRP 300 to transmit all PRS portions. As another example, the server 400 may respond to the UE 500 indicating that the UE 500 will not process PRS portions in combination by causing the TRP 300 to transmit a subset of the possible PRS portions (e.g., to send a PRS portion with a largest bandwidth such that a PRS measurement will be of the highest accuracy possible without causing the UE 500 to process other PRS portions). As another example, the PRS scheduling unit 460 may configure the TRP 300 to send PRS portions that do not meet criteria of the UE 500 for combining PRS portions, for example if the TRP 300 is unable to transmit a combination of PRS portions that the UE 500 can process in combination.

Also at stage 1130, the server 400 may send a configuration message 1134 to the UE 500. The configuration message 1134 may indicate the PRS configuration of the TRP 300 to facilitate the UE 500 measuring and processing the PRS (e.g., frequency-hopped PRS) from the TRP 300. The configuration message 1134 is shown being sent directly from the server 400 to the UE 500, but may be sent via the TRP 300.

At stage 1140, the server 400 may determine positioning timeline information. For example, the positioning timeline unit 470 may be configured to use information from the message(s) 1124, 1126 to determine what latency to expect for receiving position information from the UE 500 and/or what accuracy to expect from such position information. The positioning timeline unit 470 may use this information to determine timing of determination of position of the UE 500 with desired accuracy. The server 400 may determine accuracy based on the reported capability(ies) of the UE 500 for processing PRS, e.g., with the server 400 determining what processing the UE 500 will perform based on the reported capability(ies) and the PRS configuration provided at stage 1130, and determining the accuracy based on the processing. Stage 1140 may be performed before, concurrently with, and/or after stage 1130.

At stage 1150, the UE 500 receives one or more positioning reference signals. In this example, the TRP 300 sends PRS 1152 (which may include one or more PRS signals) with frequency-hopped PRS portions to the UE 500. Which PRS portions the TRP 300 sends are based on the configuration message 1132.

At stage 1160, the UE 500 determines one or more positioning signal measurements. For example, the processor 510 may process frequency-hopped PRS portions separately to determine measurements for each of the PRS portions. As another example, the processor 510 may process multiple frequency-hopped PRS portions in combination (e.g., by coherently combining the PRS portions) to determine one or more measurements for the PRS portions, e.g., a single ToA for the PRS portions. For example, the processor 510 may process samples of the multiple PRS portions on the same FFT to determine a measurement (e.g., ToA, RSTD). The processor 510 may use one or more measurements to determine other position information, e.g., may use multiple measurements to determine a position of the UE 500. The processor 510 may process multiple PRS portions in combination where some PRS portions meet combining criteria and one or more other PRS portions do not meet the criteria. For example, if three PRS portions are transmitted in the PRS 1152, and two of the PRS portions meet criteria of the UE 500 for combining PRS portions, but the third PRS portion does not (e.g., is separated from a nearest one of the other two PRS portions by too much frequency and/or too much time), then the processor 510 may process the two PRS portions in combination and ignore the third PRS portion.

At stage 1170, the UE 500 may send position information to the server 400 in a position information message 1172. The position information message 1172 may include raw signal information and/or processed positioning signal information such as a positioning reference signal measurement and/or a position of the UE 500. The determined position of the UE 500 may be called a position estimate. The position information message 1172 includes information regarding the one or more PRS portions processed to determine the corresponding position information. For example, the message 1172 may indicate that multiple PRS portions were not processed in combination. This indication may be explicit or may be implicit (e.g., an indication of a single PRS portion corresponding to position information such as a measurement). As another example, if the position information was determined by processing multiple PRS portions in combination, then the message 1172 may include, in association with the position information (e.g., a measurement), a bandwidth of PRS portions (a sum of the bandwidths of the PRS portions) processed in combination, a frequency span of PRS portions processed in combination, an explicit indication of accuracy (e.g., a margin of error of a ToA), a quantity of PRS portions processed in combination, a quantity of resource blocks processed in combination, and/or an indication (e.g., a bitmap) of PRS portions processed in combination, etc. The information regarding the PRS portion(s) processed to determine the position information may be included in a quality metric.

At stage 1180, the server 400 may determine the position of the UE 500. The server 400 may collect position information from one or more position information messages 1172 and perform one or more positioning techniques to determine the location of the UE 500. The server 400 may use position information from the message(s) 1172 to update a previously-determined position for the UE 500. The server 400 may determine accuracy of the positioning based on the reported capability(ies) of the UE 500 for processing the PRS, an indication of the actual processing performed by the UE 500 on the PRS, and/or properties of the PRS portions processed by the UE 500. Thus, the positioning may be implicitly determined in addition to or instead of an explicit indication of the accuracy provided by the UE 500.

Operation

Figure 12:
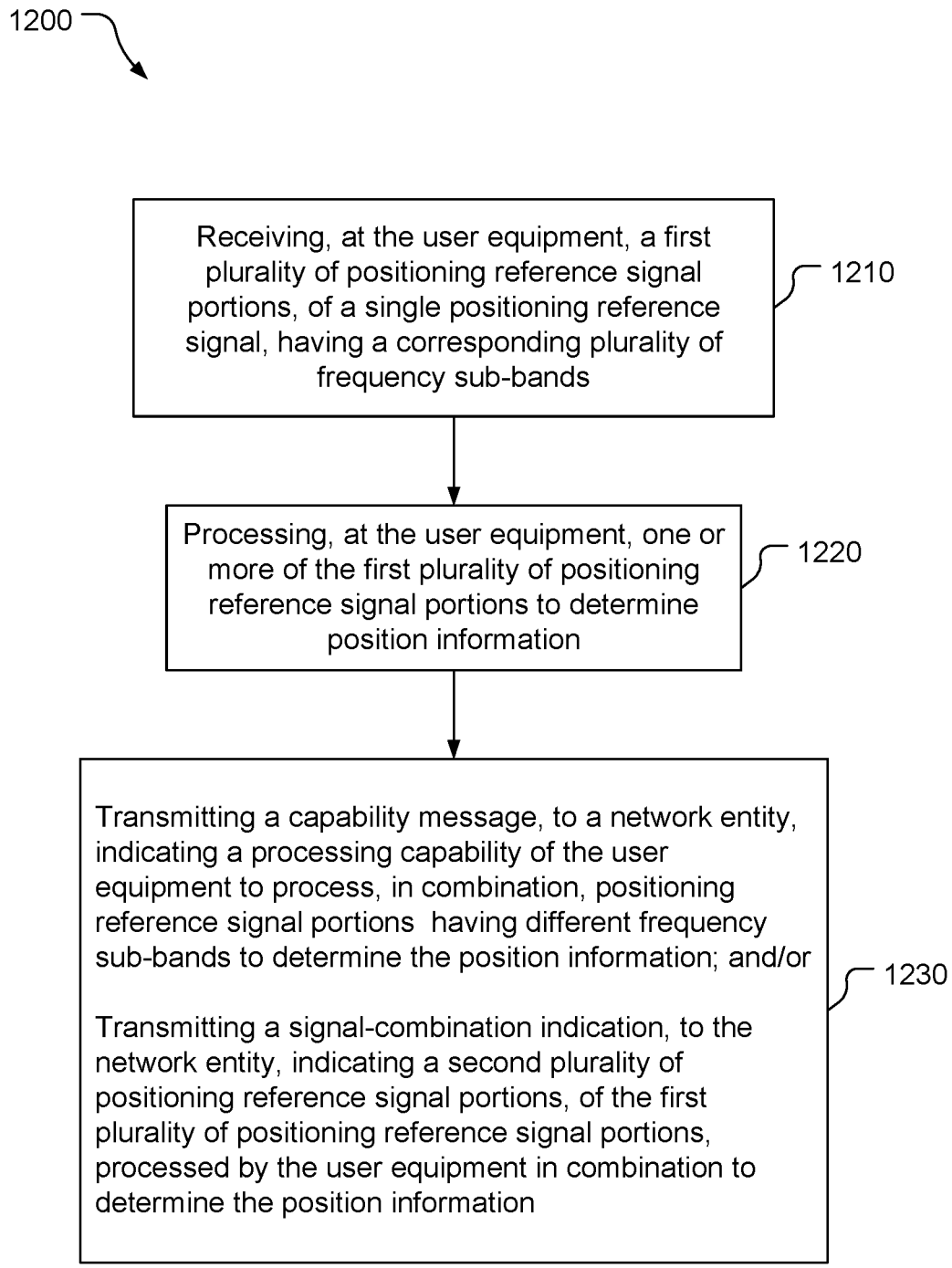
FIG. 12 is a block flow diagram of a method position determination of a user equipment.

Referring to FIG. 12, with further reference to FIGS. 1-11, a method 1200 of facilitating position determination of a UE includes the stages shown. The method 1200 is, however, an example only and not limiting. The method 1200 may be altered, e.g., by having stages added, removed, rearranged, combined, performed concurrently, and/or having single stages split into multiple stages.

At stage 1210, the method 1200 includes receiving, at a user equipment, a first plurality of positioning reference signal portions having a corresponding plurality of frequency sub-bands. For example, the UE 500 receives frequency-hopped PRS portions in the PRS 1152, e.g., the PRS portions 811-814 or other PRS portions. The processor 510, the memory 530, and the interface 520 (e.g., the wireless receiver 244 and the antenna 246) may comprise means for receiving the first plurality of positioning reference signal portions.

At stage 1220, the method 1200 includes processing, at the user equipment, one or more of the first plurality of positioning reference signal portions to determine position information. For example, the UE 500 can measure the PRS 1152 at stage 1160. The UE 500 may combine PRS portions of different sub-bands in combination if possible, e.g., the UE 500 is configured to process, in combination, PRS portions that are included in the PRS 1152. For example, the UE 500 may apply the different PRS portions to the same FFT to determine a ToA, and RSTD, or other measurement, and may use one or more measurements to determine other position information such as a position estimate of the UE 500. Alternatively, the UE 500 may process different PRS portions separately, e.g., if the UE 500 is not configured to process frequency-hopped PRS portions in combination, or if the PRS 1152 contains PRS portions that the UE 500 is not configured to process in combination. As an example, processing the one or more of the first plurality of positioning reference signal portions may comprise coherently combining all of the first plurality of positioning reference signal portions to determine the position information. As another example, processing the one or more of the first plurality of positioning reference signal portions may comprise coherently combining fewer than all of the first plurality of positioning reference signal portions. For example, the UE 500 may process some PRS portions in combination and not process, or process separately, one or more other PRS portions if the other portions (at least in combination with the PRS portions processed in combination) fail to meet one or more criteria of the UE 500 for processing PRS portions in combination. The processor 510 and the memory 530 may comprise means for processing one or more of the first plurality of positioning reference signal portions.

At stage 1230, the method 1200 includes at least one of: transmitting a capability message, to a network entity, indicating a processing capability of the user equipment to process, in combination, positioning reference signal portions having different frequency sub-bands to determine the position information; or transmitting a signal-combination indication, to the network entity, indicating a second plurality of positioning reference signal portions, of the first plurality of positioning reference signal portions, processed by the user equipment in combination to determine the position information. For example, the UE 500 may send the processing capability message(s) 1122, 1126 indicating the capability of the UE 500 to process multiple PRS portions of different sub-bands in combination (where the capability message(s) 1122, 1126 may indicate that the UE 500 will not process PRS portions of different sub-bands in combination (e.g., an inability or unwillingness to do so)). The capability message may be an explicit indication of the ability of the UE 500 to process PRS portions of different sub-bands in combination, i.e., an explicit indication of combinable sub-bands although the indication may be coded, e.g., a bitmap corresponding to combinable sub-bands. The processing capability may be that the user equipment is configured to process the one or more of the first plurality of positioning reference signal portions separately. For example, the UE 500 may indicate that the UE 500 will process PRS portions of different sub-bands separately. This may be an indication of a temporary (e.g., for a specified time, or until a specified trigger occurs, etc.) processing configuration or a permanent processing configuration. Sending the capability message(s) 1122, 1126 may help the server 400 schedule positioning events, e.g., position updates, e.g., based on latency associated with processing capability of the UE 500 and transmission capability of the TRP 300. Sending the capability message(s) 1122, 1126 may help the server 400 determine whether one or more quality metrics will be met, e.g., based on accuracy associated with processing capability of the UE 500 and transmission capability of the TRP 300. As another example, the UE 500 may send the signal-combination indication, e.g., to the server 400 in the positioning message 1172 or another message, with the signal-combination indication including a bitmap indicating the second plurality of positioning reference signal portions. The signal-combination indication may be explicit (e.g., the bitmap) or implicit (e.g., based on an accuracy reported, or one or more capabilities associated with a UE ID that is sent to the network entity). Using a bitmap may save communication overhead and corresponding processing power to produce and send the indication and to receive and interpret the indication. The processor 510, the memory 530, and the interface 520 (e.g., the wireless transmitter 242 and the antenna 246) may comprise means for transmitting the capability message and/or means for transmitting the signal-combination indication.

Implementations of the method 1200 may include one or more of the following features. In an example implementation, the method 1200 may include transmitting the capability message, where the processing capability is that the user equipment is configured to process the second plurality of positioning reference signal portions in combination, and where the capability message includes one or more criteria regarding the second plurality of positioning reference signal portions. For example, the UE 500 may send the capability message(s) 1122, 1126 including one or more criteria (such as those discussed above) for the UE 500 to process PRS portions of different sub-bands in combination. This may help the server 400 determine a PRS configuration of the TRP 300 (possibly multiple TRPs 300), to determine positioning scheduling, and/or the ability to meet one or more quality of service criteria. The one or more criteria may include a quantity (e.g., a maximum quantity) of the second plurality of positioning reference signal portions that the user equipment is configured to coherently combine, a maximum time separation between any consecutive-in-time pair of the second plurality of positioning reference signal portions that the user equipment is configured to coherently combine, a maximum frequency separation between any consecutive-in-frequency pair of the second plurality of positioning reference signal portions that the user equipment is configured to coherently combine, a maximum frequency span of the second plurality of positioning reference signal portions that the user equipment is configured to coherently combine, and/or which of the first plurality of positioning reference signal portions comprise the second plurality of positioning reference signal portions.

Also or alternatively, implementations of the method 1200 may include one or more of the following features. In an example implementation, the method 1200 may include transmitting the position information to the network entity, where the position information includes a time of arrival and an indication of one or more of the one or more first plurality of positioning reference signal portions processed by the user equipment to determine the time of arrival. The time of arrival may correspond to one or more of the first plurality of positioning reference signal portions. The UE 500 may send the position information message 1172 including, for example, one or more measurements, a position estimate of the UE 500, etc. The processor 510, the memory 530, and the interface 520 (e.g., the wireless transmitter 242 and the antenna 246) may comprise means for transmitting the position information. In another example implementation, the position information may include a plurality of times of arrival and a plurality of portion indications each indicating the one or more of the one or more first plurality of positioning reference signal portions processed by the user equipment to determine a corresponding one of the plurality of times of arrival. Each of the plurality of times of arrival may correspond to one or more of the one or more first plurality of positioning reference signal portions. In another example implementation, the method 1200 may include transmitting the position information to the network entity, where the position information includes a time of arrival and an accuracy indication indicating an accuracy of the time of arrival. If other position information is provided, the UE 500 may indicate the accuracy of the other position information (e.g., an RSTD, a position estimate for the UE 500, etc.).

Implementation Examples

Implementation examples are provided in the following numbered clauses.

1. A user equipment configured for wireless signal exchange, the user equipment comprising:
   means for receiving a first plurality of positioning reference signal portions having a corresponding plurality of frequency sub-bands;
   processing means for processing one or more of the first plurality of positioning reference signal portions to determine position information; and
   at least one of:
   first transmitting means for transmitting a capability message, to a network entity, indicating a processing capability of the means for processing to process, in combination, positioning reference signal portions having different frequency sub-bands to determine the position information; or
   second transmitting means for transmitting a signal-combination indication, to the network entity, indicating a second plurality of positioning reference signal portions, of the first plurality of positioning reference signal portions, processed by the processing means in combination to determine the position information.

2. The user equipment of clause 1, wherein the user equipment includes the first transmitting means, wherein the processing capability is that the processing means include means for processing the second plurality of positioning reference signal portions in combination, and wherein the capability message includes one or more criteria regarding the second plurality of positioning reference signal portions.

3. The user equipment of clause 2, wherein the one or more criteria comprise:
   a quantity of the second plurality of positioning reference signal portions that the processing means are configured to coherently combine; or
   a maximum time separation between any consecutive-in-time pair of the second plurality of positioning reference signal portions that the processing means are configured to coherently combine; or
   a maximum frequency separation between any consecutive-in-frequency pair of the second plurality of positioning reference signal portions that the processing means are configured to coherently combine; or
   a maximum frequency span of the second plurality of positioning reference signal portions that the processing means are configured to coherently combine; or
   which of the first plurality of positioning reference signal portions comprise the second plurality of positioning reference signal portions.

4. The user equipment of clause 1, wherein the user equipment includes the first transmitting means, and wherein the processing capability is that the processing means include means for processing the one or more of the first plurality of positioning reference signal portions separately.

5. The user equipment of clause 1, wherein the user equipment comprises the second transmitting means, and wherein the signal-combination indication includes a bitmap indicating the second plurality of positioning reference signal portions.

6. The user equipment of clause 1, further comprising third transmitting means for transmitting the position information to the network entity, wherein the position information comprises:
   a time of arrival; and
   an indication of one or more of the one or more first plurality of positioning reference signal portions processed by the processing means to determine the time of arrival.

7. The user equipment of clause 6, wherein the position information comprises:
   a plurality of times of arrival; and
   a plurality of portion indications each indicating the one or more of the one or more first plurality of positioning reference signal portions processed by the processing means to determine a corresponding one of the plurality of times of arrival.

8. The user equipment of clause 1, further comprising third transmitting means for transmitting the position information to the network entity, wherein the position information comprises:
   a time of arrival; and
   an accuracy indication indicating an accuracy of the time of arrival.

9. A non-transitory, processor-readable storage medium comprising processor-readable instructions configured to cause a processor, in order to facilitate position determination of a user equipment, to:
   receive, at the user equipment, a first plurality of positioning reference signal portions having a corresponding plurality of frequency sub-bands;

process, at the user equipment, one or more of the first plurality of positioning reference signal portions to determine position information; and at least one of:

transmit a capability message, to a network entity, indicating a processing capability of the processor to process, in combination, positioning reference signal portions having different frequency sub-bands to determine the position information; or transmit a signal-combination indication, to the network entity, indicating a second plurality of positioning reference signal portions, of the first plurality of positioning reference signal portions, processed by the processor in combination to determine the position information.

10. The storage medium of clause 9, wherein the instructions comprise instructions configured to cause the processor to transmit the capability message, wherein the processing capability is that the processor can process the second plurality of positioning reference signal portions in combination, and wherein the capability message includes one or more criteria regarding the second plurality of positioning reference signal portions.

11. The storage medium of clause 10, wherein the one or more criteria comprise:

a quantity of the second plurality of positioning reference signal portions that the instructions are configured to cause the processor to coherently combine; or a maximum time separation between any consecutive-in-time pair of the second plurality of positioning reference signal portions that the instructions are configured to cause the processor to coherently combine; or a maximum frequency separation between any consecutive-in-frequency pair of the second plurality of positioning reference signal portions that the instructions are configured to cause the processor to coherently combine; or a maximum frequency span of the second plurality of positioning reference signal portions that the instructions are configured to cause the processor to coherently combine; or which of the first plurality of positioning reference signal portions comprise the second plurality of positioning reference signal portions.

12. The storage medium of clause 9, wherein the instructions comprise instructions configured to cause the processor to transmit the capability message, and wherein the processing capability is that the processor is configured to process the one or more of the first plurality of positioning reference signal portions separately.

13. The storage medium of clause 9, where wherein the instructions comprise instructions configured to cause the processor to transmit the signal-combination indication including a bitmap indicating the second plurality of positioning reference signal portions.

14. The storage medium of clause 9, further comprising instructions configured to cause the processor to transmit the position information to the network entity, wherein the position information comprises:

a time of arrival; and an indication of one or more of the one or more first plurality of positioning reference signal portions processed by the processor to determine the time of arrival.

15. The storage medium of clause 14, wherein the position information comprises:

a plurality of times of arrival; and a plurality of portion indications each indicating the one or more of the one or more first plurality of positioning reference signal portions processed by the processor to determine a corresponding one of the plurality of times of arrival.

16. The storage medium of clause 9, further comprising instructions configured to cause the processor to transmit the position information to the network entity, wherein the position information comprises:

a time of arrival; and an accuracy indication indicating an accuracy of the time of arrival.

Other Considerations

Other examples and implementations are within the scope of the disclosure and appended claims. For example, due to the nature of software and computers, functions described above can be implemented using software executed by a processor, hardware, firmware, hardwiring, or a combination of any of these. Features implementing functions may also be physically located at various positions, including being distributed such that portions of functions are implemented at different physical locations. Components, functional or otherwise, shown in the figures and/or discussed herein as being connected or communicating with each other are communicatively coupled unless otherwise noted. That is, they may be directly or indirectly connected to enable communication between them.

A statement that a feature implements, or a statement that a feature may implement, a function includes that the feature may be configured to implement the function (e.g., a statement that an item performs, or a statement that the item may perform, function X includes that the item may be configured to perform function X). Elements discussed may be components of a larger system, wherein other rules may take precedence over or otherwise modify the application of the invention. Also, a number of operations may be undertaken before, during, or after above-discussed elements or operations are considered. Accordingly, the above description does not bound the scope of the claims.

As used herein, the singular forms "a," "an," and "the" include the plural forms as well, unless the context clearly indicates otherwise. The terms "comprises," "comprising," "includes," and/or "including," as used herein, specify the presence of stated features, integers, steps, operations, elements, and/or components, but do not preclude the presence or addition of one or more other features, integers, steps, operations, elements, components, and/or groups thereof Also, as used herein, "or" as used in a list of items (possibly prefaced by "at least one of" or prefaced by "one or more of") indicates a disjunctive list such that, for example, a list of "at least one of A, B, or C," or a list of "one or more of A, B, or C" or a list of "A or B or C" means A, or B, or C, or AB (A and B), or AC (A and C), or BC (B and C), or ABC (i.e., A and B and C), or combinations with more than one feature (e.g., AA, AAB, ABBC, etc.). Thus, a recitation that an item, e.g., a processor, is configured to perform a function regarding at least one of A or B, or a recitation that an item is configured to perform a function A or a function B, means that the item may be configured to perform the function regarding A, or may be configured to perform the function regarding B, or may be configured to perform the function regarding A and B. For example, a phrase of "a processor configured to measure at least one of A or B" or "a processor configured to measure A or measure B" means that the processor may be configured to measure A (and may or may not be configured to measure B), or may be configured to measure B (and may or may not be configured to measure A), or may be configured to measure A and measure B (and may be configured to select which, or both, of A and B to measure). Similarly, a recitation of a means for measuring at least one of A or B includes means for measuring A (which may or may not be able to measure B), or means for measuring B (and may or may not be configured to measure A), or means for measuring A and B (which may be able to select which, or both, of A and B to measure). As another example, a recitation that an item, e.g., a processor, is configured to at least one of perform function X or perform function Y means that the item may be configured to perform the function X, or may be configured to perform the function Y, or may be configured to perform the function X and to perform the function Y. For example, a phrase of "a processor configured to at least one of measure X or measure Y" means that the processor may be configured to measure X (and may or may not be configured to measure Y), or may be configured to measure Y (and may or may not be configured to measure X), or may be configured to measure X and to measure Y (and may be configured to select which, or both, of X and Y to measure).

Substantial variations may be made in accordance with specific requirements. For example, customized hardware might also be used, and/or particular elements might be implemented in hardware, software (including portable software, such as applets, etc.) executed by a processor, or both. Further, connection to other computing devices such as network input/output devices may be employed.

As used herein, unless otherwise stated, a statement that a function or operation is "based on" an item or condition means that the function or operation is based on the stated item or condition and may be based on one or more items and/or conditions in addition to the stated item or condition.

The systems and devices discussed above are examples. Various configurations may omit, substitute, or add various procedures or components as appropriate. For instance, features described with respect to certain configurations may be combined in various other configurations. Different aspects and elements of the configurations may be combined in a similar manner. Also, technology evolves and, thus, many of the elements are examples and do not limit the scope of the disclosure or claims.

A wireless communication system is one in which communications are conveyed wirelessly, i.e., by electromagnetic and/or acoustic waves propagating through atmospheric space rather than through a wire or other physical connection. A wireless communication network may not have all communications transmitted wirelessly, but is configured to have at least some communications transmitted wirelessly. Further, the term "wireless communication device," or similar term, does not require that the functionality of the device is exclusively, or evenly primarily, for communication, or that the device be a mobile device, but indicates that the device includes wireless communication capability (one-way or two-way), e.g., includes at least one radio (each radio being part of a transmitter, receiver, or transceiver) for wireless communication.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations provides a description for implementing described techniques. Various changes may be made in the function and arrangement of elements without departing from the scope of the disclosure.

The terms "processor-readable medium," "machine-readable medium," and "computer-readable medium," as used herein, refer to any medium that participates in providing data that causes a machine to operate in a specific fashion. Using a computing platform, various processor-readable media might be involved in providing instructions/code to processor(s) for execution and/or might be used to store and/or carry such instructions/code (e.g., as signals). In many implementations, a processor-readable medium is a physical and/or tangible storage medium. Such a medium may take many forms, including but not limited to, non-volatile media and volatile media. Non-volatile media include, for example, optical and/or magnetic disks. Volatile media include, without limitation, dynamic memory.

Having described several example configurations, various modifications, alternative constructions, and equivalents may be used without departing from the scope of the disclosure. For example, the above elements may be components of a larger system, wherein other rules may take precedence over or otherwise modify the application of the invention. Also, a number of operations may be undertaken before, during, or after the above elements are considered. Accordingly, the above description does not bound the scope of the claims.

A statement that a value exceeds (or is more than or above) a first threshold value is equivalent to a statement that the value meets or exceeds a second threshold value that is slightly greater than the first threshold value, e.g., the second threshold value being one value higher than the first threshold value in the resolution of a computing system. A statement that a value is less than (or is within or below) a first threshold value is equivalent to a statement that the value is less than or equal to a second threshold value that is slightly lower than the first threshold value, e.g., the second threshold value being one value lower than the first threshold value in the resolution of a computing system.

The invention claimed is:

1. A user equipment configured for wireless signal transfer, the user equipment comprising:
a transceiver;
a memory; and
a processor, communicatively coupled to the transceiver and the memory, and configured to:
receive, via the transceiver, a first plurality of positioning reference signal portions having a corresponding plurality of frequency sub-bands;
process one or more of the first plurality of positioning reference signal portions;
transmit a capability message, via the transceiver to a network entity, indicating a processing capability of the user equipment to process, in combination, all frequencies of the positioning reference signal portions having different frequency sub-bands to determine first position information based on a combination of the different frequency sub-bands; and
transmit second position information and a signal-combination indication, via the transceiver to the network entity, indicating that all frequencies of a second plurality of positioning reference signal portions, of the first plurality of positioning reference signal portions, were processed by the processor in combination to determine the second position information.

2. The user equipment of claim 1, wherein the processor is configured to coherently combine all of the first plurality of positioning reference signal portions to determine the first position information.

3. The user equipment of claim 1, wherein the processor is configured to coherently combine fewer than all of the first plurality of positioning reference signal portions to determine the first position information.

4. The user equipment of claim 1, wherein the processor is configured to transmit the capability message, wherein the processing capability is that the processor is configured to process the second plurality of positioning reference signal portions in combination, and wherein the capability message includes one or more criteria of the second plurality of positioning reference signal portions in order for the processor to process the second plurality of positioning reference signal portions in combination.

5. The user equipment of claim 4, wherein the one or more criteria comprise:
   a quantity of the second plurality of positioning reference signal portions that the processor is configured to coherently combine; or
   a maximum time separation between any consecutive-in-time pair of the second plurality of positioning reference signal portions that the processor is configured to coherently combine; or
   a maximum frequency separation between any consecutive-in-frequency pair of the second plurality of positioning reference signal portions that the processor is configured to coherently combine; or
   a maximum frequency span of the second plurality of positioning reference signal portions that the processor is configured to coherently combine; or
   which of the first plurality of positioning reference signal portions comprise the second plurality of positioning reference signal portions.

6. The user equipment of claim 1, wherein the processor is configured to transmit the capability message to expressly indicate that the processor is configured to process the one or more of the first plurality of positioning reference signal portions separately.

7. The user equipment of claim 1, wherein the processor is configured to transmit the signal-combination indication including a bitmap indicating the second plurality of positioning reference signal portions.

8. The user equipment of claim 1, wherein the processor is configured to transmit the second position information, via the transceiver, to the network entity, and wherein the second position information comprises:
   a time of arrival; and
   an indication of one or more positioning reference signal portions, of the second plurality of positioning reference signal portions, processed by the processor to determine the time of arrival.

9. The user equipment of claim 8, wherein the second position information comprises:
   a plurality of times of arrival; and
   a plurality of portion indications each indicating the one or more positioning reference signal portions, of the one or more second plurality of positioning reference signal portions, processed by the processor to determine a corresponding one of the plurality of times of arrival.

10. The user equipment of claim 1, wherein the processor is configured to transmit the second position information, via the transceiver, to the network entity, and wherein the second position information comprises:
    a time of arrival; and
    an accuracy indication indicating an accuracy of the time of arrival.

11. The user equipment of claim 1, wherein each of the positioning reference signal portions comprises one or more positioning reference signal resource elements.

12. The user equipment of claim 1, wherein the second plurality of positioning reference signal portions corresponds to at least two distinct positioning reference signal configurations.

13. A user equipment configured for wireless signal transfer, the user equipment comprising:
    means for receiving a first plurality of positioning reference signal portions having a corresponding plurality of frequency sub-bands;
    processing means for processing one or more of the first plurality of positioning reference signal portions;
    first transmitting means for transmitting a capability message, to a network entity, indicating a processing capability of the means for processing to process, in combination, all frequencies of the positioning reference signal portions having different frequency sub-bands to determine first position information based on a combination of the different frequency sub-bands; and
    second transmitting means for transmitting second position information and a signal-combination indication, to the network entity, indicating that all frequencies of a second plurality of positioning reference signal portions, of the first plurality of positioning reference signal portions, processed by the processing means in combination to determine the second position information.

14. The user equipment of claim 13, wherein the processing means include means for coherently combining all of the first plurality of positioning reference signal portions to determine the first position information.

15. The user equipment of claim 13, wherein the processing means include means for coherently combining fewer than all of the first plurality of positioning reference signal portions to determine the first position information.

16. The user equipment of claim 13, wherein the user equipment includes the first transmitting means, wherein the processing capability is that the processing means include means for processing the second plurality of positioning reference signal portions in combination, and wherein the capability message includes one or more criteria of the second plurality of positioning reference signal portions in order for the means for processing to process the second plurality of positioning reference signal portions in combination.

17. A method of facilitating position determination of a user equipment, the method comprising:
    receiving, at the user equipment, a first plurality of positioning reference signal portions having a corresponding plurality of frequency sub-bands;
    processing, at the user equipment, one or more of the first plurality of positioning reference signal portions;
    transmitting a capability message, to a network entity, indicating a processing capability of the user equipment to process, in combination, all frequencies of the positioning reference signal portions having different frequency sub-bands to determine first position information based on a combination of the different frequency sub-bands; and
    transmitting second position information a signal-combination indication, to the network entity, indicating that all frequencies of a second plurality of positioning reference signal portions, of the first plurality of positioning reference signal portions, processed by the user equipment in combination to determine the second position information.

18. The method of claim 17, wherein processing the one or more of the first plurality of positioning reference signal portions comprises coherently combining all of the first plurality of positioning reference signal portions to determine the first position information.

19. The method of claim 17, wherein processing the one or more of the first plurality of positioning reference signal portions comprises coherently combining fewer than all of the first plurality of positioning reference signal portions to determine the first position information.

20. The method of claim 17, wherein the method comprises transmitting the capability message, wherein the processing capability is that the user equipment is configured to process the second plurality of positioning reference signal portions in combination, and wherein the capability message includes one or more criteria of the second plurality of positioning reference signal portions in order for the user equipment to process the second plurality of positioning reference signal portions in combination.

21. The method of claim 20, wherein the one or more criteria comprise:
a quantity of the second plurality of positioning reference signal portions that the user equipment is configured to coherently combine; or
a maximum time separation between any consecutive-in-time pair of the second plurality of positioning reference signal portions that the user equipment is configured to coherently combine; or
a maximum frequency separation between any consecutive-in-frequency pair of the second plurality of positioning reference signal portions that the user equipment is configured to coherently combine; or
a maximum frequency span of the second plurality of positioning reference signal portions that the user equipment is configured to coherently combine; or
which of the first plurality of positioning reference signal portions comprise the second plurality of positioning reference signal portions.

22. The method of claim 17, wherein the method comprises transmitting the capability message to expressly indicate that the user equipment is configured to process the one or more of the first plurality of positioning reference signal portions separately.

23. The method of claim 17, wherein the method comprises transmitting the signal-combination indication including a bitmap indicating the second plurality of positioning reference signal portions.

24. The method of claim 17, comprising transmitting the second position information to the network entity, wherein the second position information comprises:
a time of arrival; and
an indication of one or more positioning reference signal portions of the second plurality of positioning reference signal portions processed by the user equipment to determine the time of arrival.

25. The method of claim 24, wherein the second position information comprises:
a plurality of times of arrival; and
a plurality of portion indications each indicating the one or more positioning reference signal portions, of the one or more second plurality of positioning reference signal portions, processed by the user equipment to determine a corresponding one of the plurality of times of arrival.

26. The method of claim 17, comprising transmitting the second position information to the network entity, wherein the second position information comprises:
a time of arrival; and
an accuracy indication indicating an accuracy of the time of arrival.

27. A non-transitory, processor-readable storage medium comprising processor-readable instructions configured to cause a processor, in order to facilitate position determination of a user equipment, to:
receive, at the user equipment, a first plurality of positioning reference signal portions having a corresponding plurality of frequency sub-bands; process, at the user equipment, one or more of the first plurality of positioning reference signal portions;
transmit a capability message, to a network entity, indicating a processing capability of the processor to process, in combination, all frequencies of the positioning reference signal portions having different frequency sub-bands to determine first position information based on a combination of the different frequency sub-bands; and
transmit second position information and a signal-combination indication, to the network entity, indicating that all frequencies of a second plurality of positioning reference signal portions, of the first plurality of positioning reference signal portions, processed by the processor in combination to determine the second position information.

28. The non-transitory, processor-readable storage medium of claim 27, wherein the instructions configured to cause the processor to process the one or more of the first plurality of positioning reference signal portions comprise instructions configured to cause the processor to coherently combining all of the first plurality of positioning reference signal portions to determine the first position information.

29. The non-transitory, processor-readable storage medium of claim 27, wherein the instructions configured to cause the processor to process the one or more of the first plurality of positioning reference signal portions comprise instructions configured to cause the processor to coherently combining fewer than all of the first plurality of positioning reference signal portions to determine the first position information.

30. The non-transitory, processor-readable storage medium of claim 27, wherein the instructions comprise instructions configured to cause the processor to transmit the capability message, wherein the processing capability is that the processor can process the second plurality of positioning reference signal portions in combination, and wherein the capability message includes one or more criteria of the second plurality of positioning reference signal portions in order for the processor to process the second plurality of positioning reference signal portions in combination.

* * * * *